(12) United States Patent
Soll et al.

(10) Patent No.: US 6,453,609 B1
(45) Date of Patent: Sep. 24, 2002

(54) METHOD FOR UPTAKE OF A SUBSTANCE INTO A SEED

(75) Inventors: David R. Soll; Karla J. Daniels, both of Iowa City; Donovan P. Gibson, Lone Tree, all of IA (US)

(73) Assignee: University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 09/655,811

(22) Filed: Sep. 6, 2000

(51) Int. Cl.⁷ .............................. A01C 1/06; A01C 1/00
(52) U.S. Cl. ....................................................... 47/57.6
(58) Field of Search ................... 47/57.6, 58.1; 504/100

(56) References Cited

U.S. PATENT DOCUMENTS

| | | |
|---|---|---|
| 3,307,289 A | 3/1967 | Lemm |
| 3,499,436 A | 3/1970 | Balamuth |
| 3,703,051 A | 11/1972 | Weinberger |
| 3,902,273 A | 9/1975 | Friedman |
| 4,055,915 A | 11/1977 | Charnoe |
| 4,173,651 A | 11/1979 | Muramoto et al. |
| 4,211,744 A | 7/1980 | Boucher |
| 4,292,322 A | 9/1981 | Muramoto et al. |
| 4,671,254 A | 6/1987 | Fair |
| 4,680,889 A | 7/1987 | Carlson |
| 4,834,789 A | 5/1989 | Carlson |
| 5,003,965 A | 4/1991 | Talish et al. |
| 5,048,520 A | 9/1991 | Vago |
| 5,065,761 A | 11/1991 | Pell |
| 5,143,063 A | 9/1992 | Fellner |
| 5,158,070 A | 10/1992 | Dory |
| 5,209,221 A | 5/1993 | Riedlinger |
| 5,219,401 A | 6/1993 | Cathignol et al. |
| 5,271,470 A | 12/1993 | King et al. |
| 5,295,484 A | 3/1994 | Marcus et al. |
| 5,305,737 A | 4/1994 | Vago |
| 5,380,411 A | 1/1995 | Schlief |
| 5,383,459 A | 1/1995 | Iwama |
| 5,431,621 A | 7/1995 | Dory |
| 5,498,431 A | 3/1996 | Lindner |
| 5,731,265 A | 3/1998 | Hou et al. |
| 5,950,362 A * | 9/1999 | Shors et al. ............... 47/61 |
| 6,195,936 B1 * | 3/2001 | Soll et al. ............... 47/57.6 |
| 6,250,011 B1 * | 6/2001 | Soll et al. ............... 47/57.6 |

OTHER PUBLICATIONS

Weinberger, Anderson, Donovan, Changes in Production, Yield, and Chemical Composition of Corn after Ultrasound Treatments of the Seeds, Radiation and Environmental Biophysics, 1979, 81–88, 16.

Crawford, The Application of High Intensity Sound for The Stimulation of Plant Growth, Proceedings of the Institute of Acoustics, 1977.

(List continued on next page.)

Primary Examiner—Peter M. Poon
Assistant Examiner—Jeffrey L. Gellner
(74) Attorney, Agent, or Firm—Daniel A. Rosenberg; Kent A. Herink; Davis Brown Law Firm

(57) ABSTRACT

The invention consists of a sonication and imbibition process for the uptake of water and/or other beneficial substances into a seed. The seed to be treated is immersed in water or other liquids. The seed is exposed to sound energy at frequencies between 15 kHz and 30 kHz for periods between about 1 and 15 minutes. The ultrasonic energy generates cavitational forces by the adiabatic collapse of microbubbles in the liquid medium, particularly those bubbles that collapse at the surface of the seed. The ultrasonic cavitational forces impart an enhanced stable memory for the seeds to imbibe water and/or other substances beneficial to the seed and/or plant. The ultrasonically treated seed can be dried, stored, and later imbibed with a substance that enhances a growth characteristic of the seed or resultant plant. Upon germination, the plant maintains the enhanced growth characteristics. The effect is substantially enhanced by saturating the water with a noble gas such as helium or argon, or combinations of inert gases.

24 Claims, 31 Drawing Sheets

| | Originally Sonicated Seed (Test) | | | | Originally Soaked Seed (Control) | | | |
|---|---|---|---|---|---|---|---|---|
| Seed No. | Weight Before 15 min. Incubation (am) | Weight After 15 min. Incubation (am) | Difference | Percent Water Uptake | Weight Before 15 min. Incubation (am) | Weight After 15 min. Incubation (a.m.) | Difference | Percent Water Uptake |
| 1 | 289 | 354 | 65 | 22 | 293 | 305 | 12 | 4 |
| 2 | 252 | 289 | 37 | 15 | 267 | 280 | 13 | 5 |
| 3 | 269 | 321 | 52 | 19 | 615 | 330 | 15 | 5 |
| 4 | 269 | 311 | 42 | 16 | 231 | 249 | 18 | 8 |
| 5 | 281 | 229 | 48 | 17 | 303 | 321 | 18 | 6 |
| 6 | 287 | 344 | 57 | 20 | 288 | 301 | 13 | 5 |
| 7 | 271 | 313 | 42 | 16 | 291 | 305 | 14 | 5 |
| 8 | 296 | 336 | 39 | 13 | 313 | 324 | 11 | 4 |
| 9 | 256 | 305 | 49 | 19 | 283 | 293 | 10 | 4 |
| 10 | 296 | 345 | 49 | 16 | 292 | 304 | 12 | 4 |
| 11 | 260 | 294 | 34 | 13 | 306 | 319 | 13 | 4 |
| 12 | 290 | 323 | 33 | 11 | 291 | 303 | 12 | 4 |
| 13 | 202 | 229 | 27 | 13 | 262 | 274 | 12 | 5 |
| 14 | 277 | 312 | 35 | 13 | 269 | 279 | 10 | 4 |
| 15 | 321 | 404 | 83 | 25 | 325 | 339 | 14 | 4 |
| 16 | 279 | 328 | 49 | 16 | | | | |
| Mean+Standard Deviation | 275+26 | 321+37 | 46+14 | 14+3 | 283+30 | 301+24 | 17+15 | 5+1 |

OTHER PUBLICATIONS

Rubstova, Effect of Ultrasound on the Germination of the Seeds and on Productivity of Fodder Beans.

Ronnqvist, A Method and a Device for the Pollination of Plants, 1991.

Kajita, Promotion of Growth of Rice Plant Seed, 1987.

Wilhelm, Process for Disinfecting Plants and Plant Tissues, 1996.

Jorsboe, A Method for Introducing Molecules, Particularly Genetic Material, Into Plant Cells, 1991.

Yamaguchi, Terakawa, Transformation of Plant and Production of Transgenic Plant, 1998.

Kozhukhar, Kvasenkov, Pilipenko, Anthocyanin Dye Extn. from Plant Materials.

Seed Germination Propulsion Apparatus—Includes Light Source to Propel Seed Germination, 1997.

Gel Coated Seed Germination—Involves Subjecting Coated Seed, to Ulstrsonic Vibration, 1997.

Imamaliev, Klubovich, Madraimov, Seed Pre–Sowing Treatment Process—By Exposing to Ultrasound, 1983.

Ishiwatari, Ultrasonic Wave Irradiation Treatment Method for Seed Germination Acceleration.

Atroshchen, Avsievich, Sarukhanov, Seed Processing Method—Using Ultrasound in Liquid Pressure.

* cited by examiner

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 267 | 305 | 38 | 14.2% | 302 | 314 | 12 | 4.0% |
| 2 | 277 | 329 | 52 | 18.8% | 229 | 246 | 17 | 7.4% |
| 3 | 267 | 337 | 70 | 26.2% | 291 | 313 | 22 | 7.6% |
| 4 | 281 | 335 | 54 | 19.2% | 286 | 300 | 14 | 4.9% |
| 5 | 259 | 310 | 51 | 19.7% | 274 | 289 | 15 | 5.5% |
| 6 | 245 | 311 | 66 | 26.9% | 311 | 324 | 13 | 4.2% |
| 7 | 293 | 343 | 50 | 17.1% | 323 | 353 | 30 | 9.3% |
| 8 | 274 | 323 | 49 | 17.9% | 246 | 256 | 10 | 4.1% |
| 9 | 300 | 360 | 60 | 20.0% | 283 | 327 | 44 | 15.5% |
| 10 | 287 | 328 | 41 | 14.3% | 283 | 296 | 13 | 4.6% |
| 11 | 269 | 313 | 44 | 16.4% | 279 | 295 | 16 | 5.7% |
| 12 | 223 | 291 | 68 | 30.5% | 290 | 320 | 30 | 10.3% |
| 13 | 247 | 300 | 53 | 21.5% | 312 | 334 | 22 | 7.1% |
| 14 | 268 | 330 | 62 | 23.1% | 328 | 347 | 19 | 5.8% |
| 15 | 247 | 283 | 36 | 14.6% | 255 | 283 | 28 | 11.0% |
| 16 | 312 | 387 | 75 | 24.0% | 263 | 279 | 16 | 6.1% |
| 17 | 260 | 289 | 29 | 11.2% | 261 | 272 | 11 | 4.2% |
| 18 | 276 | 318 | 42 | 15.2% | 237 | 248 | 11 | 4.6% |
| 19 | 276 | 330 | 54 | 19.6% | 258 | 274 | 16 | 6.2% |
| 20 | 301 | 356 | 55 | 18.3% | 244 | 255 | 11 | 4.5% |
| MEAN: | 271.5 | 323.9 | 52.5 | 19.4% | 277.8 | 296.3 | 18.5 | 6.6% |
| STDDEV: | 21.5 | 25.7 | 12.1 | 4.8% | 28.6 | 32.4 | 8.7 | 3.0% |

Fig. 2

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 276 | 313 | 37 | 13.4% | 196 | 206 | 10 | 5.1% |
| 2 | 194 | 233 | 39 | 20.1% | 225 | 237 | 12 | 5.3% |
| 3 | 189 | 222 | 33 | 17.5% | 257 | 272 | 15 | 5.8% |
| 4 | 248 | 282 | 34 | 13.7% | 269 | 285 | 16 | 5.9% |
| 5 | 246 | 297 | 51 | 20.7% | 217 | 226 | 9 | 4.1% |
| 6 | 270 | 318 | 48 | 17.8% | 237 | 249 | 12 | 5.1% |
| 7 | 211 | 248 | 37 | 17.5% | 262 | 276 | 14 | 5.3% |
| 8 | 156 | 188 | 32 | 20.5% | 261 | 284 | 23 | 8.8% |
| 9 | 282 | 316 | 34 | 12.1% | 187 | 204 | 17 | 9.1% |
| 10 | 203 | 239 | 36 | 17.7% | 209 | 223 | 14 | 6.7% |
| 11 | 276 | 338 | 62 | 22.5% | 134 | 145 | 11 | 8.2% |
| 12 | 218 | 256 | 38 | 17.4% | 194 | 208 | 14 | 7.2% |
| 13 | 256 | 304 | 48 | 18.8% | 223 | 236 | 13 | 5.8% |
| 14 | 253 | 291 | 38 | 15.0% | 280 | 294 | 14 | 5.0% |
| 15 | 192 | 226 | 34 | 17.7% | 229 | 238 | 9 | 3.9% |
| MEAN: | 231.3 | 271.4 | 40.1 | 17.5% | 225.3 | 238.9 | 13.5 | 6.1% |
| STDDEV: | 39.1 | 44.2 | 8.4 | 2.9% | 38.4 | 39.9 | 3.5 | 1.6% |

*Fig. 3*

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 229 | 263 | 34 | 14.8% | 273 | 315 | 42 | 15.4% |
| 2 | 324 | 358 | 34 | 10.5% | 273 | 281 | 8 | 2.9% |
| 3 | 298 | 355 | 57 | 19.1% | 287 | 301 | 14 | 4.9% |
| 4 | 250 | 318 | 68 | 27.2% | 279 | 290 | 11 | 3.9% |
| 5 | 266 | 340 | 74 | 27.8% | 294 | 308 | 14 | 4.8% |
| 6 | 248 | 304 | 56 | 22.6% | 305 | 319 | 14 | 4.6% |
| 7 | 268 | 327 | 59 | 22.0% | 323 | 362 | 39 | 12.1% |
| 8 | 265 | 303 | 38 | 14.3% | 249 | 261 | 12 | 4.8% |
| 9 | 265 | 313 | 48 | 18.1% | 268 | 282 | 14 | 5.2% |
| 10 | 286 | 326 | 40 | 14.0% | 248 | 260 | 12 | 4.8% |
| 11 | 284 | 320 | 36 | 12.77% | 267 | 282 | 15 | 5.6% |
| 12 | 285 | 340 | 55 | 19.3% | 320 | 352 | 32 | 10.0% |
| 13 | 283 | 322 | 39 | 13.8% | 252 | 266 | 14 | 5.6% |
| 14 | 298 | 335 | 37 | 12.4% | 249 | 263 | 14 | 5.6% |
| 15 | 304 | 336 | 32 | 10.5% | 274 | 286 | 12 | 4.4% |
| 16 | 283 | 321 | 38 | 13.4% | 243 | 257 | 14 | 5.8% |
| 17 | 231 | 294 | 63 | 27.3% | 250 | 263 | 13 | 5.2% |
| 18 | 282 | 336 | 54 | 19.1% | 272 | 286 | 14 | 5.1% |
| 19 | 288 | 328 | 40 | 13.9% | 265 | 290 | 25 | 9.4% |
| 20 | 330 | 356 | 26 | 7.9% | 299 | 327 | 28 | 9.4% |
| MEAN: | 278.4 | 324.8 | 46.4 | 17.0% | 274.5 | 292.6 | 18.1 | 6.5% |
| STDDEV: | 26.6 | 22.6 | 13.4 | 5.9% | 23.9 | 30.2 | 9.7 | 3.1% |

Fig. 4

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 299 | 329 | 30 | 10.0% | 247 | 258 | 11 | 4.5% |
| 2 | 241 | 268 | 27 | 11.2% | 241 | 251 | 10 | 4.1% |
| 3 | 242 | 278 | 36 | 14.9% | 220 | 229 | 9 | 4.1% |
| 4 | 273 | 303 | 30 | 11.0% | 247 | 262 | 15 | 6.1% |
| 5 | 248 | 273 | 25 | 10.1% | 235 | 247 | 12 | 5.1% |
| 6 | 272 | 303 | 31 | 11.4% | 250 | 262 | 12 | 4.8% |
| 7 | 262 | 295 | 33 | 12.6% | 226 | 235 | 9 | 4.0% |
| 8 | 259 | 293 | 34 | 13.1% | 258 | 270 | 12 | 4.7% |
| 9 | 240 | 270 | 30 | 12.5% | 263 | 276 | 13 | 4.9% |
| 10 | 264 | 297 | 33 | 12.5% | 308 | 324 | 16 | 5.2% |
| 11 | 293 | 363 | 70 | 23.9% | 306 | 324 | 18 | 5.9% |
| 12 | 268 | 290 | 22 | 8.2% | 357 | 265 | 8 | 3.1% |
| 13 | 247 | 300 | 53 | 21.5% | 203 | 213 | 10 | 4.9% |
| 14 | 276 | 345 | 69 | 25.0% | 240 | 261 | 21 | 8.8% |
| 15 | 272 | 352 | 80 | 29.4% | 214 | 225 | 11 | 5.1% |
| 16 | 244 | 272 | 28 | 11.5% | 232 | 249 | 17 | 7.3% |
| 17 | 301 | 352 | 51 | 16.9% | 238 | 251 | 13 | 5.5% |
| 18 | 289 | 331 | 42 | 14.5% | 271 | 286 | 15 | 5.5% |
| 19 | 263 | 311 | 48 | 18.3% | 251 | 264 | 13 | 5.2% |
| 20 | 256 | 309 | 53 | 20.7% | 283 | 300 | 17 | 6.0% |
| MEAN: | 265.5 | 306.7 | 41.3 | 15.5% | 249.5 | 262.6 | 13.1 | 5.2% |
| STDDEV: | 19.2 | 29.6 | 16.6 | 5.8% | 27.3 | 29.2 | 3.4 | 1.2% |

Fig. 5

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 122 | 155 | 33 | 27.0% | 123 | 133 | 10 | 8.1% |
| 2 | 174 | 214 | 40 | 23.0% | 100 | 108 | 8 | 8.0% |
| 3 | 139 | 172 | 33 | 23.7% | 124 | 139 | 15 | 12.1% |
| 4 | 138 | 178 | 40 | 29.0% | 127 | 142 | 15 | 11.8% |
| 5 | 142 | 175 | 33 | 23.2% | 162 | 177 | 15 | 9.3% |
| 6 | 148 | 193 | 45 | 30.4% | 128 | 140 | 12 | 9.4% |
| 7 | 132 | 170 | 38 | 28.8% | 150 | 174 | 24 | 16.0% |
| 8 | 132 | 176 | 44 | 33.3% | 140 | 161 | 21 | 15.0% |
| 9 | 127 | 157 | 30 | 23.6% | 189 | 207 | 18 | 9.5% |
| 10 | 114 | 140 | 26 | 22.8% | 122 | 134 | 12 | 9.8% |
| 11 | 139 | 190 | 51 | 36.7% | 118 | 131 | 13 | 11.0% |
| 12 | 131 | 163 | 32 | 24.4% | 141 | 156 | 15 | 10.6% |
| 13 | 170 | 206 | 36 | 21.2% | 117 | 128 | 11 | 9.4% |
| 14 | 122 | 155 | 33 | 27.0% | 99 | 110 | 11 | 11.1% |
| 15 | 186 | 251 | 65 | 34.9% | 142 | 158 | 16 | 11.3% |
| 16 | 94 | 137 | 43 | 45.7% | 145 | 157 | 12 | 8.3% |
| 17 | 155 | 199 | 44 | 28.4% | 154 | 173 | 19 | 12.3% |
| 18 | 163 | 196 | 33 | 20.2% | 117 | 130 | 13 | 11.1% |
| 19 | 118 | 150 | 32 | 27.1% | 174 | 191 | 17 | 9.8% |
| 20 | 161 | 197 | 36 | 22.4% | 175 | 189 | 14 | 8.0% |
| MEAN: | 140.4 | 178.7 | 38.4 | 27.7% | 137.4 | 151.9 | 14.6 | 10.6% |
| STDDEV: | 22.6 | 27.8 | 8.8 | 6.2% | 24.6 | 27.1 | 3.9 | 2.2% |

*Fig. 6*

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 255 | 300 | 45 | 17.6% | 265 | 278 | 13 | 4.9% |
| 2 | 276 | 304 | 28 | 10.1% | 278 | 293 | 15 | 5.4% |
| 3 | 268 | 321 | 53 | 19.8% | 330 | 352 | 22 | 6.7% |
| 4 | 265 | 302 | 37 | 14.0% | 263 | 274 | 11 | 4.2% |
| 5 | 293 | 338 | 45 | 15.4% | 259 | 274 | 15 | 5.8% |
| 6 | 260 | 300 | 40 | 15.4% | 258 | 270 | 12 | 4.7% |
| 7 | 253 | 296 | 43 | 17.0% | 252 | 264 | 12 | 4.8% |
| 8 | 276 | 335 | 59 | 21.4% | 271 | 283 | 12 | 4.4% |
| 9 | 268 | 349 | 81 | 30.2% | 285 | 298 | 13 | 4.6% |
| 10 | 244 | 286 | 42 | 17.2% | 271 | 286 | 15 | 5.5% |
| 11 | 271 | 315 | 44 | 16.2% | 325 | 342 | 17 | 5.2% |
| 12 | 253 | 283 | 30 | 11.9% | 282 | 298 | 16 | 5.7% |
| 13 | 257 | 293 | 36 | 14.0% | 326 | 340 | 14 | 4.3% |
| 14 | 315 | 382 | 67 | 21.3% | 274 | 287 | 13 | 4.7% |
| 15 | 268 | 330 | 62 | 23.1% | 275 | 289 | 14 | 5.1% |
| 16 | 292 | 336 | 44 | 15.1% | 272 | 286 | 14 | 5.1% |
| 17 | 267 | 306 | 39 | 14.6% | 272 | 284 | 12 | 4.4% |
| 18 | 249 | 303 | 54 | 21.7% | 281 | 294 | 13 | 4.6% |
| 19 | 269 | 313 | 44 | 16.4% | 297 | 314 | 17 | 5.7% |
| 20 | 295 | 341 | 46 | 15.6% | 307 | 323 | 16 | 5.2% |
| 21 | 284 | 310 | 26 | 9.2% | 291 | 305 | 14 | 4.8% |
| MEAN: | 270.4 | 316.3 | 46.0 | 17.0% | 282.6 | 296.6 | 14.3 | 5.0% |
| STDDEV: | 17.6 | 24.1 | 13.2 | 4.7% | 22.6 | 24.5 | 2.5 | 0.6% |

Fig. 7

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 276 | 306 | 30 | 10.9% | 306 | 320 | 14 | 4.6% |
| 2 | 286 | 353 | 67 | 23.4% | 287 | 314 | 27 | 9.4% |
| 3 | 288 | 331 | 43 | 14.9% | 287 | 303 | 16 | 5.6% |
| 4 | 314 | 359 | 45 | 14.3% | 282 | 297 | 15 | 5.3% |
| 5 | 265 | 316 | 51 | 19.2% | 261 | 273 | 12 | 4.6% |
| 6 | 227 | 288 | 61 | 26.9% | 249 | 296 | 47 | 18.9% |
| 7 | 292 | 330 | 38 | 13.0% | 304 | 320 | 16 | 5.3% |
| 8 | 277 | 337 | 60 | 21.7% | 296 | 315 | 19 | 6.4% |
| 9 | 246 | 285 | 39 | 15.9% | 340 | 353 | 13 | 3.8% |
| 10 | 274 | 314 | 40 | 14.6% | 283 | 296 | 13 | 4.6% |
| 11 | 274 | 350 | 76 | 27.7% | 333 | 348 | 15 | 4.5% |
| 12 | 281 | 359 | 78 | 27.8% | 261 | 292 | 31 | 11.9% |
| 13 | 272 | 309 | 37 | 13.6% | 240 | 251 | 11 | 4.6% |
| 14 | 256 | 288 | 32 | 12.5% | 297 | 311 | 14 | 4.7% |
| 15 | 308 | 350 | 42 | 13.6% | 281 | 295 | 14 | 5.0% |
| 16 | 272 | 330 | 58 | 21.3% | 239 | 250 | 11 | 4.6% |
| 17 | 298 | 357 | 59 | 19.8% | 285 | 299 | 14 | 4.9% |
| 18 | 304 | 355 | 51 | 16.8% | 307 | 320 | 13 | 4.2% |
| 19 | 286 | 338 | 52 | 18.2% | 264 | 277 | 13 | 4.9% |
| 20 | 268 | 333 | 65 | 24.3% | 273 | 291 | 18 | 6.6% |
| MEAN: | 278.2 | 329.4 | 51.2 | 18.5% | 283.8 | 301.1 | 17.3 | 6.2% |
| STDDEV: | 20.8 | 24.6 | 14.0 | 5.4% | 27.2 | 26.4 | 8.6 | 3.5% |

Fig. 8

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 260 | 291 | 31 | 11.9% | 271 | 286 | 15 | 5.5% |
| 2 | 289 | 332 | 43 | 14.9% | 260 | 273 | 13 | 5.0% |
| 3 | 298 | 329 | 31 | 10.4% | 285 | 305 | 20 | 7.0% |
| 4 | 331 | 380 | 49 | 14.8% | 269 | 293 | 24 | 8.9% |
| 5 | 290 | 341 | 51 | 17.6% | 283 | 304 | 21 | 7.4% |
| 6 | 290 | 317 | 27 | 9.3% | 265 | 277 | 12 | 4.5% |
| 7 | 277 | 317 | 40 | 14.4% | 276 | 293 | 17 | 6.2% |
| 8 | 279 | 322 | 43 | 15.4% | 263 | 280 | 17 | 6.5% |
| 9 | 275 | 316 | 41 | 14.9% | 300 | 314 | 14 | 4.7% |
| 10 | 307 | 354 | 47 | 15.3% | 282 | 297 | 15 | 5.3% |
| 11 | 258 | 295 | 37 | 14.3% | 264 | 281 | 17 | 6.4% |
| 12 | 286 | 349 | 63 | 22.0% | 320 | 336 | 16 | 5.0% |
| 13 | 324 | 385 | 61 | 18.8% | 323 | 340 | 17 | 5.3% |
| 14 | 258 | 301 | 43 | 16.7% | 293 | 309 | 16 | 5.5% |
| 15 | 300 | 354 | 54 | 18.0% | 286 | 302 | 16 | 5.6% |
| 16 | 291 | 345 | 54 | 18.6% | 321 | 339 | 18 | 5.6% |
| 17 | 297 | 328 | 31 | 10.4% | 314 | 329 | 15 | 4.8% |
| 18 | 296 | 336 | 40 | 13.5% | 315 | 333 | 18 | 5.7% |
| 19 | 289 | 324 | 35 | 12.1% | 277 | 291 | 14 | 5.1% |
| 20 | 256 | 285 | 29 | 11.3% | 299 | 311 | 12 | 4.0% |
| MEAN: | 287.6 | 330.1 | 42.5 | 14.7% | 288.3 | 304.7 | 16.4 | 5.7% |
| STDDEV: | 20.4 | 26.8 | 10.5 | 3.3% | 21.2 | 21.5 | 3.0 | 1.1% |

Fig. 9

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 296.2 | 345.4 | 49.2 | 16.6% | 285.4 | 299.2 | 13.8 | 4.8% |
| 2 | 287.6 | 336.6 | 49.0 | 17.0% | 281.4 | 294.7 | 13.3 | 4.7% |
| 3 | 298.6 | 345.8 | 47.2 | 15.8% | 284.5 | 300.8 | 16.3 | 5.7% |
| 4 | 289.6 | 325.3 | 35.7 | 12.3% | 290.9 | 307.7 | 16.8 | 5.8% |
| 5 | 281.6 | 319.7 | 38.1 | 13.5% | 288.3 | 303.0 | 14.7 | 5.1% |
| 6 | 284.9 | 341.0 | 56.1 | 19.7% | 280.8 | 296.1 | 15.3 | 5.4% |
| 7 | 284.6 | 329.7 | 45.1 | 15.8% | 284.0 | 299.9 | 15.9 | 5.6% |
| 8 | 295.4 | 335.9 | 40.5 | 13.7% | 289.5 | 304.0 | 14.6 | 5.0% |
| 9 | 284.2 | 331.0 | 46.8 | 16.5% | 302.7 | 318.1 | 15.4 | 5.1% |
| 10 | 291.2 | 341.5 | 50.3 | 17.3% | 289.7 | 304.4 | 14.7 | 5.1% |
| 11 | 288.0 | 341.9 | 53.9 | 18.7% | 285.3 | 298.5 | 13.3 | 4.6% |
| 12 | 280.3 | 325.3 | 45.0 | 16.1% | 287.2 | 303.3 | 16.2 | 5.6% |
| MEAN: | 288.5 | 334.9 | 46.4 | 16.1% | 287.5 | 302.5 | 15.0 | 5.2% |
| STDDEV: | 5.9 | 8.6 | 6.0 | 2.1% | 5.8 | 6.1 | 1.2 | 0.4% |

Fig. 10

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 293.7 | 331.3 | 37.7 | 12.8% | 282.8 | 297.1 | 14.3 | 5.1% |
| 2 | 285.7 | 327.8 | 42.1 | 14.7% | 303.3 | 315.3 | 12.1 | 4.0% |
| 3 | 295.9 | 346.4 | 50.5 | 17.1% | 288.3 | 302.1 | 13.8 | 4.8% |
| 4 | 294.6 | 330.2 | 35.6 | 12.1% | 285.9 | 300.6 | 14.7 | 5.1% |
| 5 | 303.2 | 332.0 | 28.8 | 9.5% | 296.4 | 312.1 | 15.8 | 5.3% |
| 6 | 296.3 | 325.5 | 29.1 | 9.8% | 283.5 | 298.7 | 15.2 | 5.4% |
| 7 | 296.7 | 327.4 | 30.7 | 10.3% | 292.3 | 308.0 | 15.7 | 5.4% |
| 8 | 293.7 | 326.2 | 32.5 | 11.1% | 296.2 | 310.9 | 14.7 | 5.0% |
| 9 | 286.9 | 321.9 | 35.0 | 12.2% | 294.0 | 308.0 | 14.0 | 4.8% |
| 10 | 299.4 | 332.1 | 32.7 | 10.9% | 289.7 | 303.2 | 13.5 | 4.7% |
| 11 | 301.0 | 336.8 | 35.8 | 11.9% | 299.2 | 315.7 | 16.5 | 5.5% |
| 12 | 281.8 | 322.9 | 41.1 | 14.6% | 293.4 | 308.4 | 15.0 | 5.1% |
| MEAN: | 294.1 | 330.0 | 36.0 | 12.3% | 292.1 | 306.6 | 14.6 | 5.0% |
| STDDEV: | 6.4 | 6.7 | 6.2 | 2.2% | 6.3 | 6.3 | 1.2 | 0.4% |

Fig. 11

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 282.3 | 334.5 | 52.2 | 18.5% | 297.4 | 317.2 | 19.8 | 6.7% |
| 2 | 286.1 | 340.3 | 54.1 | 18.9% | 286.6 | 303.4 | 16.8 | 5.9% |
| 3 | 281.7 | 336.2 | 54.5 | 19.3% | 274.5 | 296.6 | 22.1 | 8.1% |
| 4 | 297.6 | 346.8 | 49.3 | 16.6% | 286.7 | 305.8 | 19.1 | 6.7% |
| 5 | 286.4 | 337.6 | 51.2 | 17.9% | 301.4 | 324.0 | 22.6 | 7.5% |
| 6 | 284.5 | 325.6 | 41.1 | 14.4% | 292.1 | 310.9 | 18.8 | 6.5% |
| 7 | 282.2 | 334.4 | 52.2 | 18.5% | 272.0 | 287.4 | 15.4 | 5.7% |
| 8 | 287.8 | 340.9 | 53.1 | 18.5% | 280.8 | 298.4 | 17.6 | 6.3% |
| 9 | 282.6 | 332.6 | 50.0 | 17.7% | 288.5 | 309.7 | 21.2 | 7.3% |
| 10 | 282.4 | 337.4 | 55.0 | 19.5% | 280.7 | 301.0 | 20.3 | 7.2% |
| 11 | 285.9 | 328.5 | 42.6 | 14.9% | 290.4 | 312.0 | 21.6 | 7.4% |
| 12 | 294.1 | 343.9 | 49.8 | 16.9% | 297.1 | 318.3 | 21.2 | 7.1% |
| MEAN: | 286.1 | 336.5 | 50.4 | 17.6% | 287.3 | 307.0 | 19.7 | 6.9% |
| STDDEV: | 5.0 | 6.1 | 4.4 | 1.6% | 9.1 | 10.4 | 2.2 | 0.7% |

Fig. 12

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT INCREASE IN WEIGHT OF SONICATED SEED | CONTROL SEED WEIGHT BEFORE SOAKING (mg) | CONTROL SEED WEIGHT POST SOAKING (mg) | CONTROL SEED WEIGHT DIFFERENCE | PERCENT INCREASE IN WEIGHT OF SOAKED SEED (CONTROL) |
|---|---|---|---|---|---|---|---|---|
| 1 | 35 | 44 | 9 | 25.7% | 51 | 54 | 3 | 5.9% |
| 2 | 45 | 53 | 8 | 17.8% | 50 | 53 | 3 | 6.0% |
| 3 | 32 | 38 | 6 | 18.8% | 46 | 48 | 2 | 4.3% |
| 4 | 55 | 64 | 9 | 16.4% | 56 | 59 | 3 | 5.4% |
| 5 | 53 | 61 | 8 | 15.1% | 56 | 61 | 5 | 8.9% |
| 6 | 27 | 31 | 4 | 14.8% | 35 | 38 | 3 | 8.6% |
| 7 | 59 | 69 | 10 | 16.9% | 44 | 47 | 3 | 6.8% |
| 8 | 29 | 34 | 5 | 17.2% | 50 | 55 | 5 | 10.0% |
| 9 | 33 | 40 | 7 | 21.2% | 48 | 50 | 2 | 4.2% |
| 10 | 55 | 63 | 8 | 14.5% | 47 | 51 | 4 | 8.5% |
| 11 | 51 | 61 | 10 | 19.6% | 35 | 37 | 2 | 5.7% |
| 12 | 51 | 60 | 9 | 17.6% | 54 | 57 | 3 | 5.6% |
| 13 | 53 | 62 | 9 | 17.0% | 37 | 40 | 3 | 8.1% |
| 14 | 41 | 51 | 10 | 24.4% | 57 | 61 | 4 | 7.0% |
| 15 | 45 | 51 | 6 | 13.3% | 54 | 57 | 3 | 5.6% |
| 16 | 38 | 40 | 2 | 5.3% | 49 | 52 | 3 | 6.1% |
| 17 | 54 | 64 | 10 | 18.5% | 43 | 46 | 3 | 7.0% |
| 18 | 42 | 50 | 8 | 19.0% | 50 | 54 | 4 | 8.0% |
| 19 | 56 | 64 | 8 | 14.3% | 47 | 49 | 2 | 4.3% |
| 20 | 50 | 60 | 10 | 20.0% | 39 | 41 | 2 | 5.1% |
| MEAN: | 45.2 | 53 | 7.8 | 17.4% | 47.4 | 50.5 | 3.1 | 6.6% |
| STDDEV: | 9.97 | 11.54 | 2.21 | 4.3% | 6.82 | 7.29 | 0.91 | 1.7% |

Fig. 13

| GROUP #, 20 SEEDS PER RUN | SEED WEIGHT BEFORE SONICATION (mg) | SEED WEIGHT POST SONICATION (mg) | CHANGE IN WEIGHT (mg) | PERCENT WATER UPTAKE | GROUP #, 20 SEEDS PER RUN | SEED WEIGHT BEFORE SOAKING (mg) | SEED WEIGHT POST SOAKING (mg) | CHANGE IN WEIGHT | PERCENT WATER UPTAKE (mg) |
|---|---|---|---|---|---|---|---|---|---|
| GROUP 1 | | | | | | | | | |
| 1 | 2960 | 3174 | 214 | 7.2% | 1 | 2653 | 2675 | 22 | 0.8% |
| 2 | 2921 | 3220 | 299 | 10.2% | 2 | 2884 | 2949 | 65 | 2.3% |
| 3 | 2814 | 2903 | 89 | 3.2% | 3 | 2575 | 2629 | 54 | 2.1% |
| 4 | 2724 | 3032 | 308 | 11.3% | 4 | 2774 | 2831 | 57 | 2.1% |
| 5 | 2683 | 2887 | 204 | 7.6% | 5 | 2941 | 3015 | 74 | 2.5% |
| MEAN: | | | | 7.9% | MEAN: | | | | 2.0% |
| STDEV: | | | | 3.2% | STDEV: | | | | 0.7% |
| GROUP #, 20 SEEDS PER RUN | SEED WEIGHT BEFORE SONICATION (mg) | SEED WEIGHT POST SONICATION (mg) | CHANGE IN WEIGHT (mg) | PERCENT WATER UPTAKE | GROUP #, 20 SEEDS PER RUN | SEED WEIGHT BEFORE SOAKING (mg) | SEED WEIGHT POST SOAKING (mg) | CHANGE IN WEIGHT | PERCENT WATER UPTAKE (mg) |
| GROUP 2 | | | | | | | | | |
| 1 | 2929 | 3322 | 393 | 13.4% | 1 | 2736 | 2801 | 65 | 2.4% |
| 2 | 2850 | 3147 | 297 | 10.4% | 2 | 2911 | 3025 | 114 | 3.9% |
| 3 | 2864 | 3159 | 295 | 10.3% | 3 | 2986 | 3148 | 162 | 5.4% |
| 4 | 2619 | 3016 | 397 | 15.2% | 4 | 2773 | 2856 | 83 | 3.0% |
| 5 | 2893 | 3257 | 364 | 12.6% | 5 | 2823 | 2896 | 73 | 2.6% |
| MEAN: | | | | 12.4% | MEAN: | | | | 3.5% |
| STDEV: | | | | 2.1% | STDEV: | | | | 1.2% |
| GROUP #, 20 SEEDS PER RUN | SEED WEIGHT BEFORE SONICATION (mg) | SEED WEIGHT POST SONICATION (mg) | CHANGE IN WEIGHT (mg) | PERCENT WATER UPTAKE | GROUP #, 20 SEEDS PER RUN | SEED WEIGHT BEFORE SOAKING (mg) | SEED WEIGHT POST SOAKING (mg) | CHANGE IN WEIGHT | PERCENT WATER UPTAKE (mg) |
| GROUP 3 | | | | | | | | | |
| 1 | 2944 | 3477 | 533 | 18.1% | 1 | 2848 | 3038 | 190 | 6.7% |
| 2 | 2743 | 3152 | 409 | 14.9% | 2 | 2794 | 2965 | 171 | 6.1% |
| 3 | 2594 | 3049 | 455 | 17.5% | 3 | 2712 | 2803 | 91 | 3.4% |
| 4 | 2857 | 3477 | 620 | 21.7% | 4 | 2957 | 3173 | 216 | 7.3% |
| 5 | 2876 | 3405 | 529 | 18.4% | 5 | 2946 | 3058 | 112 | 3.8% |
| MEAN: | | | | 18.1% | MEAN: | | | | 5.9% |
| STDEV: | | | | 2.4% | STDEV: | | | | 1.8% |

Fig. 14

| SONICATED 39% 1X ||||
| --- | --- | --- | --- | --- |
| TIME OF TREATEMENT IN MINUTES | WEIGHT BEFORE 20 SEEDS (mg) | WEIGHT AFTER 20 SEEDS (mg) | SEED WEIGHT DIFFERENCE 20 SEEDS (mg) | PERCENT OF WATER UPTAKE |
| 2 | 5604 | 5872 | 268 | 4.8% |
| 4 | 5578 | 6009 | 431 | 7.7% |
| 6 | 5502 | 6028 | 526 | 9.6% |
| 8 | 5515 | 6196 | 681 | 12.3% |
| 8 | 5429 | 5978 | 549 | 10.1% |
| 10 | 5520 | 6290 | 770 | 13.9% |
| 10 | 5410 | 6197 | 787 | 14.5% |
| 12 | 5617 | 6276 | 659 | 11.7% |

| CONTROL SOAKED ||||
| --- | --- | --- | --- | --- |
| TIME OF TREATEMENT IN MINUTES | WEIGHT BEFORE 20 SEEDS (mg) | WEIGHT AFTER 20 SEEDS (mg) | SEED WEIGHT DIFFERENCE 20 SEEDS (mg) | PERCENT OF WATER UPTAKE |
| 2 | 5440 | 5575 | 135 | 2.5% |
| 4 | 5376 | 5507 | 131 | 2.4% |
| 6 | 5575 | 5668 | 93 | 1.7% |
| 8 | 5275 | 5346 | 71 | 1.3% |
| 8 | 5353 | 5440 | 87 | 1.6% |
| 10 | 5428 | 5595 | 167 | 3.1% |
| 10 | 5447 | 5624 | 177 | 3.2% |
| 12 | 5493 | 5593 | 100 | 1.8% |

Fig. 15

| TIME OF TREATMENT IN MINUTES | WEIGHT BEFORE 20 SEEDS (mg) | WEIGHT AFTER 20 SEEDS (mg) | SEED WEIGHT DIFFERENCE 20 SEEDS (mg) | PERCENT OF WATER UPTAKE |
|---|---|---|---|---|
| 2 | 5612 | 6018 | 406 | 7.2% |
| 4 | 5700 | 6608 | 908 | 15.9% |
| 6 | 5616 | 6593 | 977 | 17.4% |
| 8 | 5796 | 6780 | 984 | 17.0% |
| 10 | 5769 | 6710 | 941 | 16.3% |
| 10 Soaked con. | 5655 | 5940 | 285 | 5.0% |

| TIME OF TREATMENT IN MINUTES | WEIGHT BEFORE 20 SEEDS (mg) | WEIGHT AFTER 20 SEEDS (mg) | SEED WEIGHT DIFFERENCE 20 SEEDS (mg) | PERCENT OF WATER UPTAKE |
|---|---|---|---|---|
| 2 | 6244 | 6663 | 419 | 6.7% |
| 4 | 6284 | 6896 | 612 | 9.7% |
| 6 | 5891 | 6553 | 662 | 11.2% |
| 8 | 6467 | 7434 | 967 | 15.0% |
| 10 | 6207 | 7082 | 875 | 14.1% |
| 10 Soaked con. | 6239 | 6605 | 366 | 5.9% |

| TIME OF TREATMENT IN MINUTES | WEIGHT BEFORE 20 SEEDS (mg) | WEIGHT AFTER 20 SEEDS (mg) | SEED WEIGHT DIFFERENCE 20 SEEDS (mg) | PERCENT OF WATER UPTAKE |
|---|---|---|---|---|
| 2 | 2739 | 3316 | 577 | 21.1% |
| 4 | 2999 | 3732 | 733 | 24.4% |
| 6 | 3061 | 3939 | 878 | 28.7% |
| 8 | 2815 | 3752 | 937 | 33.3% |
| 8 Soaked con. | 2657 | 2929 | 272 | 10.2% |

*Fig. 16*

| TIME OF TREATEMENT IN MINUTES | WEIGHT BEFORE 20 SEEDS (mg) | WEIGHT AFTER 20 SEEDS (mg) | SEED WEIGHT DIFFERENCE 20 SEEDS (mg) | PERCENT OF WATER UPTAKE |
|---|---|---|---|---|
| 4 | 5660 | 6350 | 690 | 12.2% |
| 6 | 5711 | 6570 | 859 | 15.0% |
| 8 | 5629 | 6688 | 1059 | 18.8% |
| 10 | 5636 | 6815 | 1179 | 20.9% |
| 8 Soaked con. | 5682 | 5985 | 303 | 5.3% |

| TIME OF TREATEMENT IN MINUTES | WEIGHT BEFORE 20 SEEDS (mg) | WEIGHT AFTER 20 SEEDS (mg) | SEED WEIGHT DIFFERENCE 20 SEEDS (mg) | PERCENT OF WATER UPTAKE |
|---|---|---|---|---|
| 4 | 6288 | 6875 | 587 | 9.3% |
| 6 | 6123 | 6767 | 644 | 10.5% |
| 8 | 5721 | 6472 | 751 | 13.1% |
| 10 | 6271 | 7164 | 893 | 14.2% |
| 10 Soaked con. | 6030 | 6410 | 380 | 6.3% |

| TIME OF TREATEMENT IN MINUTES | WEIGHT BEFORE 20 SEEDS (mg) | WEIGHT AFTER 20 SEEDS (mg) | SEED WEIGHT DIFFERENCE 20 SEEDS (mg) | PERCENT OF WATER UPTAKE |
|---|---|---|---|---|
| 4 | 2853 | 3665 | 812 | 28.5% |
| 6 | 2839 | 3876 | 1037 | 36.5% |
| 8 | 2754 | 3805 | 1051 | 38.2% |
| 8 Soaked con. | 2902 | 3252 | 350 | 12.1% |

Fig. 17

Facilitated Uptake of Cresyl Violet by Sonication
Sonication clears a cresyl violet solution by promoting preferential uptake of the dye by seed.
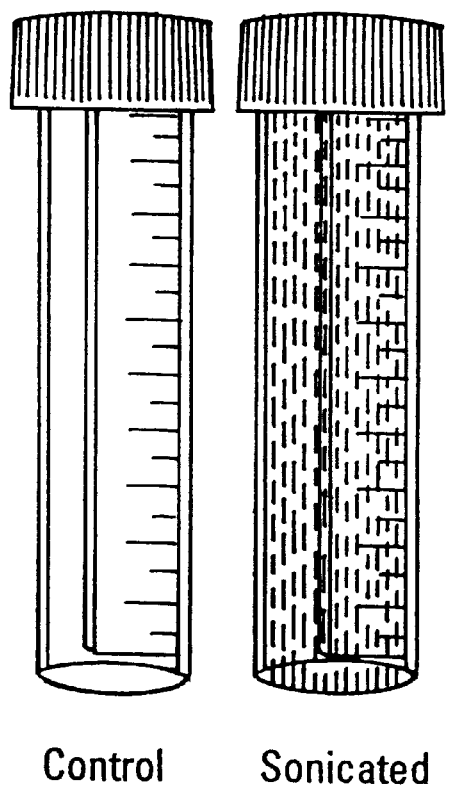
Control   Sonicated
The dye becomes concentrated in the corn embryo.
Control                                Sonicated
*Fig. 18*

Extracted Amount Of Stain (Toluidine Blue) in Corn.

| | Sonicated 15 minutes in 750 ug Stain in 15 ml water | | | Soaked 15 minutes in 750 ug Stain in 15 ml water | |
|---|---|---|---|---|---|
| Group1 | 1. | 104 ug | | 1. | 8 ug |
| | 2. | 78 ug | | 2. | 9 ug |
| | 3. | 83 ug | | 3. | 10 ug |
| | 4. | 65 ug | | 4. | 10 ug |
| | 5. | 38 ug | | 5. | 5 ug |
| | Total | 368 ug | 49% | Total 42 ug | 5.6% |
| Group2 | 1. | 88 ug | | 1. | 6 ug |
| | 2. | 56 ug | | 2. | 2 ug |
| | 3. | 46 ug | | 3. | 2 ug |
| | 4. | 53 ug | | 4. | 4 ug |
| | 5. | 63 ug | | 5. | 9 ug |
| | Total | 360 ug | 41% | Total 23 ug | 3.1% |

*Fig. 19*

SONICATED 30% 1X

| TIME OF TREATMENT IN MINUTES | WEIGHT BEFORE 20 SEEDS (mg) | WEIGHT AFTER 20 SEEDS (mg) | SEED WEIGHT DIFFERENCE 20 SEEDS (mg) | PERCENT OF WATER UPTAKE |
|---|---|---|---|---|
| 1 | 5650 | 5854 | 204 | 3.6% |
| 2 | 5693 | 6161 | 468 | 8.2% |
| 4 | 5791 | 6716 | 925 | 16.0% |
| 6 | 5484 | 6338 | 854 | 15.6% |
| 8 | 5618 | 6658 | 1040 | 18.5% |
| 10 | 5686 | 7004 | 1318 | 23.2% |

CONTROL SOAKED

| TIME OF TREATMENT IN MINUTES | WEIGHT BEFORE 20 SEEDS (mg) | WEIGHT AFTER 20 SEEDS (mg) | SEED WEIGHT DIFFERENCE 20 SEEDS (mg) | PERCENT OF WATER UPTAKE |
|---|---|---|---|---|
| 1 | 5666 | 5758 | 92 | 1.6% |
| 2 | 5606 | 5750 | 144 | 2.6% |
| 4 | 5456 | 5644 | 188 | 3.4% |
| 6 | 5613 | 5842 | 229 | 4.1% |
| 8 | 5576 | 5836 | 260 | 4.7% |
| 10 | 5776 | 6076 | 300 | 5.2% |

*Fig. 21*

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT OF SONICATED SEED WATER UPTAKE (mg) | CONTROL SEED WEIGHT BEFORE SOAKING (mg) | CONTROL SEED WEIGHT POST SOAKING (mg) | CONTROL SEED WEIGHT DIFFERENCE (mg) | PERCENT OF CONTROL SEED WATER UPTAKE |
|---|---|---|---|---|---|---|---|---|
| 1 | 275 | 286 | 11 | 4.0% | 286 | 300 | 14 | 4.9% |
| 2 | 277 | 286 | 9 | 3.2% | 285 | 299 | 14 | 4.9% |
| 3 | 274 | 289 | 15 | 5.5% | 230 | 235 | 5 | 2.2% |
| 4 | 272 | 294 | 22 | 8.1% | 241 | 249 | 8 | 3.3% |
| 5 | 252 | 261 | 9 | 3.6% | 256 | 263 | 7 | 2.7% |
| 6 | 264 | 271 | 7 | 2.7% | 268 | 273 | 5 | 1.9% |
| 7 | 292 | 311 | 19 | 6.5% | 279 | 287 | 8 | 2.9% |
| 8 | 244 | 253 | 9 | 3.7% | 298 | 305 | 7 | 2.3% |
| 9 | 340 | 344 | 4 | 1.2% | 278 | 282 | 4 | 1.4% |
| 10 | 241 | 248 | 7 | 2.9% | 259 | 264 | 5 | 1.9% |
| 11 | 283 | 296 | 13 | 4.6% | 283 | 284 | 1 | 0.4% |
| 12 | 305 | 309 | 4 | 1.3% | 291 | 297 | 6 | 2.1% |
| 13 | 291 | 293 | 2 | 0.7% | 304 | 307 | 3 | 1.0% |
| 14 | 305 | 320 | 15 | 4.9% | 277 | 279 | 2 | 0.7% |
| 15 | 306 | 310 | 4 | 1.3% | 288 | 288 | 0 | 0.0% |
| 16 | 294 | 311 | 17 | 5.8% | 350 | 353 | 3 | 0.9% |
| 17 | 258 | 272 | 14 | 5.4% | 302 | 302 | 0 | 0.0% |
| 18 | 274 | 282 | 8 | 2.9% | 295 | 295 | 0 | 0.0% |
| 19 | 310 | 316 | 6 | 1.9% | 304 | 304 | 0 | 0.0% |
| 20 | 292 | 302 | 10 | 3.4% | 291 | 292 | 1 | 0.3% |
| MEAN | 282.5 | 292.7 | 10.3 | 3.7% | 283.3 | 287.9 | 4.7 | 1.7% |
| STD DEV | 24.5 | 24.0 | 5.4 | 2.0% | 25.6 | 24.7 | 4.2 | 1.5% |

*Fig. 22*

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT OF SONICATED SEED WATER UPTAKE | CONTROL SEED WEIGHT BEFORE SOAKING (mg) | CONTROL SEED WEIGHT POST SOAKING (mg) | CONTROL SEED WEIGHT DIFFERENCE (mg) | PERCENT OF CONTROL SEED WATER UPTAKE |
|---|---|---|---|---|---|---|---|---|
| 1 | 303 | 316 | 13 | 4.3% | 285 | 295 | 10 | 3.5% |
| 2 | 292 | 314 | 22 | 7.5% | 288 | 297 | 9 | 3.1% |
| 3 | 328 | 358 | 30 | 9.1% | 288 | 296 | 8 | 2.8% |
| 4 | 248 | 270 | 22 | 8.9% | 317 | 326 | 9 | 2.8% |
| 5 | 286 | 332 | 46 | 16.1% | 255 | 262 | 7 | 2.7% |
| 6 | 287 | 321 | 34 | 11.8% | 291 | 299 | 8 | 2.7% |
| 7 | 292 | 302 | 10 | 3.4% | 259 | 265 | 6 | 2.3% |
| 8 | 303 | 342 | 39 | 12.9% | 236 | 241 | 5 | 2.1% |
| 9 | 353 | 376 | 23 | 6.5% | 283 | 291 | 8 | 2.8% |
| 10 | 265 | 284 | 19 | 7.2% | 274 | 283 | 9 | 3.3% |
| 11 | 276 | 294 | 18 | 6.5% | 293 | 301 | 8 | 2.7% |
| 12 | 276 | 290 | 14 | 5.1% | 291 | 300 | 9 | 3.1% |
| 13 | 284 | 306 | 22 | 7.7% | 296 | 303 | 7 | 2.4% |
| 14 | 242 | 254 | 12 | 5.0% | 269 | 277 | 8 | 3.0% |
| 15 | 274 | 298 | 24 | 8.8% | 289 | 294 | 5 | 1.7% |
| 16 | 300 | 315 | 15 | 5.0% | 266 | 275 | 9 | 3.4% |
| 17 | 243 | 251 | 8 | 3.3% | 334 | 341 | 7 | 2.1% |
| 18 | 267 | 312 | 45 | 16.9% | 244 | 248 | 4 | 1.6% |
| 19 | 287 | 325 | 38 | 13.2% | 293 | 299 | 6 | 2.0% |
| 20 | 287 | 301 | 14 | 4.9% | 254 | 257 | 3 | 1.2% |
| MEAN | 284.7 | 308.1 | 23.4 | 8.2% | 280.3 | 287.5 | 7.3 | 2.6% |
| STD DEV | 26.6 | 31.1 | 11.6 | 4.0% | 23.7 | 24.7 | 1.9 | 0.6% |

Fig. 23

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT OF SONICATED SEED WATER UPTAKE | CONTROL SEED WEIGHT BEFORE SOAKING (mg) | CONTROL SEED WEIGHT POST SOAKING (mg) | CONTROL SEED WEIGHT DIFFERENCE (mg) | PERCENT OF CONTROL SEED WATER UPTAKE |
|---|---|---|---|---|---|---|---|---|
| 1 | 321 | 381 | 60 | 18.7% | 259 | 268 | 9 | 3.5% |
| 2 | 315 | 341 | 26 | 8.3% | 275 | 286 | 11 | 4.0% |
| 3 | 285 | 310 | 25 | 8.8% | 280 | 294 | 14 | 5.0% |
| 4 | 258 | 283 | 25 | 9.7% | 270 | 287 | 17 | 6.3% |
| 5 | 262 | 289 | 27 | 10.3% | 253 | 265 | 12 | 4.7% |
| 6 | 301 | 330 | 29 | 9.6% | 281 | 294 | 13 | 4.6% |
| 7 | 312 | 368 | 56 | 17.9% | 269 | 280 | 11 | 4.1% |
| 8 | 291 | 344 | 53 | 18.2% | 271 | 282 | 11 | 4.1% |
| 9 | 309 | 357 | 48 | 15.5% | 296 | 304 | 8 | 2.7% |
| 10 | 314 | 374 | 60 | 19.1% | 264 | 271 | 7 | 2.7% |
| 11 | 287 | 350 | 63 | 22.0% | 275 | 284 | 9 | 3.3% |
| 12 | 299 | 390 | 91 | 30.4% | 258 | 265 | 7 | 2.7% |
| 13 | 274 | 290 | 16 | 5.8% | 271 | 278 | 7 | 2.6% |
| 14 | 337 | 433 | 96 | 28.5% | 256 | 263 | 7 | 2.7% |
| 15 | 284 | 375 | 91 | 32.0% | 269 | 275 | 6 | 2.2% |
| 16 | 268 | 303 | 35 | 13.1% | 269 | 275 | 6 | 2.2% |
| 17 | 243 | 266 | 23 | 9.5% | 247 | 255 | 8 | 3.2% |
| 18 | 278 | 319 | 41 | 14.7% | 290 | 299 | 9 | 3.1% |
| 19 | 282 | 308 | 26 | 9.2% | 293 | 300 | 7 | 2.4% |
| 20 | 271 | 305 | 34 | 12.5% | 310 | 319 | 9 | 2.9% |
| MEAN | 289.6 | 335.8 | 46.3 | 15.7% | 272.8 | 282.2 | 9.2 | 3.5% |
| STD DEV | 23.9 | 42.9 | 24.5 | 7.7% | 15.6 | 16.1 | 3.0 | 1.1% |

Fig. 24

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT OF SONICATED SEED WATER UPTAKE (mg) | CONTROL SEED WEIGHT BEFORE SOAKING (mg) | CONTROL SEED WEIGHT POST SOAKING (mg) | CONTROL SEED WEIGHT DIFFERENCE (mg) | PERCENT OF CONTROL SEED WATER UPTAKE |
|---|---|---|---|---|---|---|---|---|
| 1 | 291 | 332 | 41 | 14.1% | 292 | 304 | 12 | 4.1% |
| 2 | 281 | 331 | 50 | 17.8% | 292 | 304 | 12 | 4.1% |
| 3 | 301 | 330 | 29 | 9.6% | 278 | 288 | 10 | 3.6% |
| 4 | 292 | 319 | 27 | 9.2% | 272 | 282 | 10 | 3.7% |
| 5 | 245 | 287 | 42 | 17.1% | 285 | 298 | 13 | 4.6% |
| 6 | 269 | 342 | 73 | 27.1% | 266 | 276 | 10 | 3.8% |
| 7 | 290 | 317 | 27 | 9.3% | 309 | 323 | 6 | 4.5% |
| 8 | 301 | 336 | 35 | 11.6% | 295 | 307 | 12 | 4.1% |
| 9 | 256 | 298 | 42 | 16.4% | 271 | 281 | 10 | 3.7% |
| 10 | 254 | 291 | 37 | 14.6% | 271 | 281 | 10 | 3.7% |
| 11 | 276 | 316 | 40 | 14.5% | 274 | 283 | 9 | 3.3% |
| 12 | 250 | 291 | 41 | 16.4% | 268 | 280 | 12 | 4.5% |
| 13 | 296 | 329 | 33 | 11.1% | 267 | 279 | 12 | 4.5% |
| 14 | 244 | 299 | 55 | 22.5% | 246 | 256 | 10 | 4.1% |
| 15 | 292 | 342 | 50 | 17.1% | 278 | 289 | 11 | 4.0% |
| 16 | 277 | 308 | 31 | 11.2% | 331 | 349 | 18 | 5.4% |
| 17 | 276 | 319 | 43 | 15.6% | 282 | 291 | 9 | 3.2% |
| 18 | 253 | 307 | 54 | 21.3% | 257 | 268 | 11 | 4.3% |
| 19 | 282 | 327 | 45 | 16.0% | 292 | 304 | 12 | 4.1% |
| 20 | 258 | 316 | 58 | 22.5% | 287 | 299 | 12 | 4.2% |
| MEAN | 274.2 | 316.9 | 42.7 | 15.8% | 280.7 | 292.1 | 11.1 | 4.1% |
| STD DEV | 19.2 | 17.1 | 11.6 | 4.9% | 18.7 | 20.3 | 2.3 | 0.5% |

Fig. 25

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT OF SONICATED SEED WATER UPTAKE | CONTROL SEED WEIGHT BEFORE SOAKING (mg) | CONTROL SEED WEIGHT POST SOAKING (mg) | CONTROL SEED WEIGHT DIFFERENCE (mg) | PERCENT OF CONTROL SEED WATER UPTAKE |
|---|---|---|---|---|---|---|---|---|
| 1 | 232 | 279 | 47 | 20.3% | 294 | 307 | 13 | 4.4% |
| 2 | 300 | 377 | 77 | 25.7% | 267 | 278 | 11 | 4.1% |
| 3 | 286 | 370 | 84 | 29.4% | 262 | 272 | 10 | 3.8% |
| 4 | 276 | 311 | 35 | 12.7% | 266 | 282 | 16 | 6.0% |
| 5 | 276 | 325 | 49 | 17.8% | 311 | 330 | 19 | 6.1% |
| 6 | 281 | 319 | 38 | 13.5% | 253 | 265 | 12 | 4.7% |
| 7 | 265 | 312 | 47 | 17.7% | 313 | 326 | 6 | 4.2% |
| 8 | 298 | 338 | 40 | 13.4% | 269 | 285 | 16 | 5.9% |
| 9 | 280 | 331 | 51 | 18.2% | 267 | 278 | 11 | 4.1% |
| 10 | 299 | 350 | 51 | 17.1% | 271 | 285 | 14 | 5.2% |
| 11 | 289 | 327 | 38 | 13.1% | 252 | 263 | 11 | 4.4% |
| 12 | 251 | 297 | 46 | 18.3% | 272 | 284 | 12 | 4.4% |
| 13 | 285 | 347 | 62 | 21.8% | 270 | 281 | 11 | 4.1% |
| 14 | 284 | 351 | 67 | 23.6% | 271 | 282 | 11 | 4.1% |
| 15 | 256 | 288 | 32 | 12.5% | 254 | 267 | 13 | 5.1% |
| 16 | 296 | 346 | 50 | 16.9% | 266 | 277 | 11 | 4.1% |
| 17 | 304 | 377 | 73 | 24.0% | 341 | 357 | 16 | 4.7% |
| 18 | 296 | 361 | 65 | 22.0% | 286 | 302 | 16 | 5.6% |
| 19 | 283 | 334 | 51 | 18.0% | 257 | 269 | 12 | 4.7% |
| 20 | 281 | 317 | 36 | 12.8% | 334 | 346 | 12 | 3.6% |
| MEAN | 280.9 | 332.9 | 52.0 | 18.4% | 304.0 / 288.0 | 291.8 | 12.7 | 4.7% |
| STD DEV | 18.2 | 27.9 | 14.8 | 4.8% | | 27.4 | 2.9 | 0.8% |

Fig. 26

| SEED # | SONICATED SEED WEIGHT BEFORE SONICATION (mg) | SONICATED SEED WEIGHT POST SONICATION (mg) | SONICATED SEED WEIGHT DIFFERENCE (mg) | PERCENT OF SONICATED SEED WATER UPTAKE (mg) | CONTROL SEED WEIGHT BEFORE SOAKING (mg) | CONTROL SEED WEIGHT POST SOAKING (mg) | CONTROL SEED WEIGHT DIFFERENCE (mg) | PERCENT OF CONTROL SEED WATER UPTAKE |
|---|---|---|---|---|---|---|---|---|
| 1 | 300 | 356 | 56 | 18.7% | 304 | 328 | 24 | 7.9% |
| 2 | 311 | 376 | 65 | 20.9% | 305 | 328 | 23 | 7.5% |
| 3 | 245 | 321 | 76 | 31.0% | 298 | 324 | 26 | 8.7% |
| 4 | 270 | 336 | 66 | 24.4% | 258 | 273 | 15 | 5.8% |
| 5 | 261 | 321 | 60 | 23.0% | 248 | 264 | 16 | 6.5% |
| 6 | 252 | 300 | 48 | 19.0% | 277 | 288 | 11 | 4.0% |
| 7 | 279 | 345 | 66 | 23.7% | 297 | 310 | 13 | 4.4% |
| 8 | 273 | 360 | 87 | 31.9% | 285 | 299 | 14 | 4.9% |
| 9 | 272 | 331 | 59 | 21.7% | 254 | 257 | 3 | 1.2% |
| 10 | 298 | 364 | 66 | 22.1% | 255 | 263 | 8 | 3.1% |
| 11 | 269 | 323 | 54 | 20.1% | 328 | 339 | 11 | 3.4% |
| 12 | 323 | 404 | 81 | 25.1% | 300 | 312 | 12 | 4.0% |
| 13 | 284 | 367 | 83 | 29.2% | 256 | 270 | 14 | 5.5% |
| 14 | 289 | 348 | 59 | 20.4% | 309 | 327 | 18 | 5.8% |
| 15 | 264 | 316 | 52 | 19.7% | 306 | 315 | 9 | 2.9% |
| 16 | 284 | 324 | 40 | 14.1% | 230 | 244 | 14 | 6.1% |
| 17 | 289 | 372 | 83 | 28.7% | 349 | 363 | 14 | 4.0% |
| 18 | 336 | 434 | 98 | 29.2% | 343 | 364 | 21 | 6.1% |
| 19 | 302 | 369 | 67 | 22.2% | 306 | 328 | 22 | 7.2% |
| 20 | 284 | 337 | 53 | 18.7% | 268 | 280 | 12 | 4.5% |
| MEAN | 284.3 | 350.2 | 66.0 | 23.2% | 288.8 | 303.8 | 15 | 5.2% |
| STD DEV | 22.9 | 32.1 | 14.7 | 4.7% | 32.4 | 35.0 | 5.8 | 1.9% |

| Seed No. | Originally Sonicated Seed (Test) | | | | Originally Soaked Seed (Control) | | | |
|---|---|---|---|---|---|---|---|---|
| | Weight Before 15 min. Incubation (am) | Weight After 15 min. Incubation (am) | Difference | Percent Water Uptake | Weight Before 15 min. Incubation (am) | Weight After 15 min. Incubation (a.m.) | Difference | Percent Water Uptake |
| 1 | 289 | 354 | 65 | 22 | 293 | 305 | 12 | 4 |
| 2 | 252 | 289 | 37 | 15 | 267 | 280 | 13 | 5 |
| 3 | 269 | 321 | 52 | 19 | 615 | 330 | 15 | 5 |
| 4 | 269 | 311 | 42 | 16 | 231 | 249 | 18 | 8 |
| 5 | 281 | 229 | 48 | 17 | 303 | 321 | 18 | 6 |
| 6 | 287 | 344 | 57 | 20 | 288 | 301 | 13 | 5 |
| 7 | 271 | 313 | 42 | 16 | 291 | 305 | 14 | 5 |
| 8 | 296 | 336 | 39 | 13 | 313 | 324 | 11 | 4 |
| 9 | 256 | 305 | 49 | 19 | 283 | 293 | 10 | 4 |
| 10 | 296 | 345 | 49 | 16 | 292 | 304 | 12 | 4 |
| 11 | 260 | 294 | 34 | 13 | 306 | 319 | 13 | 4 |
| 12 | 290 | 323 | 33 | 11 | 291 | 303 | 12 | 4 |
| 13 | 202 | 229 | 27 | 13 | 262 | 274 | 12 | 5 |
| 14 | 277 | 312 | 35 | 13 | 269 | 279 | 10 | 4 |
| 15 | 321 | 404 | 83 | 25 | 325 | 339 | 14 | 4 |
| 16 | 279 | 328 | 49 | 16 | | | | |
| Mean+Standard Deviation | 275+26 | 321+37 | 46+14 | 14+3 | 283+30 | 301+24 | 17+15 | 5+1 |

FIGURE 32

| Expt. | Treatment | Time on Wet Pads (hr) | No. Seeds | Percent Germination (with roots) |
|---|---|---|---|---|
|  |  |  |  |  |
| 1 | Sonicated | 48 | 20 | 85 |
|  | Soaked | 48 | 20 | 40 |
|  |  |  |  |  |
|  | Sonicated | 56 | 20 | 90 |
|  | Soaked | 56 | 20 | 75 |
|  |  |  |  |  |
|  | Sonicated | 72 | 20 | 100 |
|  | Soaked | 72 | 20 | 100 |
|  |  |  |  |  |
| 2 | Sonicated (st. 3mm) | 48 | 10 | 50 |
|  | Soaked (st. 3mm) | 48 | 15 | 33 |
|  |  |  |  |  |
|  | Sonicated (st. 3mm) | 56 | 10 | 100 |
|  | Soaked (st. 3mm) | 56 | 15 | 73 |
|  |  |  |  |  |
|  | Sonicated (st. mm) | 72 | 10 | 100 |
|  | Soaked | 72 | 15 | 100 |

METHOD FOR UPTAKE OF A SUBSTANCE INTO A SEED

BACKGROUND OF THE INVENTION

1. Field of the Invention

The invention relates generally to a sonication and imbibition process for the uptake of water or other substances along with dissolved substances into a seed, more specifically, to a method of treating seeds with sound waves for the purpose of imparting to the seed a memory for enhanced uptake of a substance that enhances a growth characteristic of the seed or resultant plant, or otherwise adds value to the seed during commercial processing.

2. Background of the Prior Art

Seed dormancy is a unique form of developmental arrest utilized by most plants to temporally disperse germination and optimize progeny survival. During seed dormancy, moisture content and respiration rate are dramatically lowered. The initial step to break seed dormancy is the uptake (imbibition) of water necessary for respiration and mobilization of starch reserves required for germination. Imbibition is a biphasic process: I) the physical uptake of water through the seed coat and hydration of the embryo; and II) germination as determined by growth and elongation of the embryonic axis resulting in emergence of the plumule and radicle. The two phases are separated temporally, and seed that have completed phase I is said to be "primed seed," that is, primed for phase II: germination. Phase I of imbibition is also used in the commercial processing of seed, i.e. wet milling fractionation of corn and the malting process for the fermentation of distilled spirits.

Priming of seed by the enhanced imbibing of water is advantageous to plant vigor, e.g. enhanced emergence, growth and yield characteristics. Seed priming also synchronizes the germination of seed resulting in a uniform field of plants that mature simultaneously for maximal yields at harvest. In addition to water, seed priming provides access to load the seed with nutrients, microorganisms, or pest inhibitors to promote seedling establishment. By adding a molecule to the seed during imbibition phase I, the molecule or organism can be stored in the primed seed and therefore, be present at planting. The "loading of macromolecules" is very efficient in the seed when compared to the addition of similar molecules to the entire field. An example is the addition of fertilizer to stimulate root growth and hasten seedling emergence. The loading of the fertilizer into the seed prior to planting is more efficacious to the seedling and cost effective to the farmer. Other beneficial molecules to be loaded into seed are hormones such as the gibberelins/gibberellic acid to promote germination, cytokinins for cell elongation and inhibitors of abscisic acid to promote release from seed dormancy. Seed cultivars could be customized to specific growing regions by the addition of triazoles (plant growth regulators which moderate the effects of drought and high temperatures) or fungicides to inhibit the growth of fungi on seed and seedlings in cool, wet soil or insecticides to combat insects that attack seedlings such as corn rootworm. In addition to macromolecules, beneficial microorganisms such as Azospirillum or Rhizobium can be loaded during seed priming as a crop inoculant.

The commercial fractionation of corn begins with wet milling. Corn is a complex mixture of starch, protein, oil, water, fiber, minerals, vitamins, and pigments. Wet milling is the process of separating the corn components into separate homogenous fractions. In Iowa, approximately 20% of the 1 billion bushels of corn harvested each year is wet milled. The wet milling industry and collateral manufacturing represent a prodigious industrial effort. As the wet milling process is constantly refined by new technologies, novel by-products can be isolated in industrial quantities, e.g. ethanol, corn sweeteners, protein peptides, and vitamins C and E. The initial step in wet-milling, steeping, has not been altered by technological innovation. Steeping involves soaking the clean and dried corn (<16% water content) in warm water until it has swollen to 45% hydration. This process takes from 30–50 hr. at temperatures of 120–130° F. During the steeping process, large quantities of water are moved through massive vats of corn in a countercurrent stream. Also, during this time, beneficial microorganisms such as the lactobacteria and *Pseudomonas aeruginosa* growing in the steep water aid in the proteolytic cleavage of corn proteins. However, the large volumes of steep water and the time required for hydration limit the effectiveness of the bacterial digestion. The digestion by-products are purified from the steep water primarily by evaporative concentration.

The malting process is the first step in the fermentation of grain to produce alcoholic spirits. The quality of the malt (and the resulting fermentation) is dependent upon the synchronous and efficient germination of the grain. Starches stored in the seed are converted into sugars during early stages of germination. At emergence, germination is halted and converted sugars are used during fermentation for the production of ethanol. Historically, the malting process was a labor-intensive task. The grain was spread onto a "malting floor, imbibed with water from overhead sprinklers, and turned by hand daily over the course of one to two weeks to release trapped heat and gases. At plumule emergence, the starches have been converted to sugars, the germinated grain is kiln dried and ground to form malt. Microbreweries and distilleries still use variations of this old malting technique to produce high quality malt. Some distilleries induce uniform germination by the addition of gibberllic acid (GA) to produce the highest quality of malt for fermentation such as in single malt scotch distillation. GA is the plant hormone, which regulates germination. Malt production of this quality is time consuming and expensive.

Thus, a need exists for a method to enhance the ability of seeds to imbibe water and other substances.

SUMMARY OF THE INVENTION

The invention consists of a sonication and imbibition process for the uptake of water and/or other beneficial substances into a seed. The seed to be treated is immersed in water or other liquids. The seed is exposed to sound energy at frequencies between 15 kHz and 30 kHz for periods between about 1 and 15 minutes. The ultrasonic energy generates cavitational forces by the adiabatic collapse of microbubbles in the liquid medium, particularly those bubbles that collapse at the surface of the seed. The ultrasonic cavitational forces impart an enhanced stable memory for the seeds to imbibe water and/or other substances beneficial to the seed and/or plant. The ultrasonically treated seed can be dried, stored, and later imbibed with a substance that enhances a growth characteristic of the seed or resultant plant. Upon germination, the plant maintains the enhanced growth characteristics. The effectiveness of the initial sonication is substantially enhanced by saturating the water with a noble gas such as helium or argon, or combinations of inert gases.

A purpose of the invention is to impart upon seeds through a sonication and imbibition process a memory for the enhanced uptake of a substance with a beneficial growth characteristic.

These and other objects of the invention will be made clear to a person of ordinary skill in the art upon a reading and understanding of this specification, the associated drawings, and appending claims.

BRIEF DESCRIPTION OF THE DRAWINGS

FIG. 2 shows a table with data from an experiment conducted with corn seed hybrid sonicated in helium-saturated tap water.

FIG. 3 shows a table with data from an experiment conducted with corn seed hybrid sonicated in argon-saturated water.

FIG. 4 shows a table with data from an experiment identical to the experiment that generated the data for the table of FIG. 3, except performed with a different corn seed hybrid.

FIG. 5 shows a table with data from an experiment identical to the experiment that generated the data for the table of FIG. 2 except performed with argon and helium saturated tap water.

FIG. 6 shows a table with data from an experiment identical to the experiment that generated the data for the table of FIG. 3 except performed with a different corn seed hybrid.

FIG. 7 shows a table with data from an experiment identical to the experiment that generated the data for the table of FIG. 2 except performed with argon saturated water.

FIG. 8 shows a table with data from an experiment identical to the experiment that generated the data for the table of FIG. 2 except performed with tap water.

FIG. 9 shows a table with data from an experiment identical to the experiment that generated the data for the table of FIG. 2 except performed with boiled double distilled water.

FIG. 10 shows a table with data from a different experiment conducted with corn seed hybrid sonicated in argon-saturated tap water.

FIG. 11 shows a table with data from an experiment identical to the experiment that generated the data for the table of FIG. 10 except performed with a different corn seed hybrid.

FIG. 12 shows a table with data from an experiment identical to the experiment that generated the data for the table FIG. 10 except performed with yet another corn seed hybrid.

FIG. 13 shows a table with data from an experiment conducted with barley seed sonicated in argon-saturated tap water.

FIG. 14 shows a table with data from a multiple trial experiment conducted on corn seed hybrid.

FIG. 15 shows a table with data from a multiple trial experiment conducted on corn seed hybrid.

FIG. 16 shows a table with data from a multiple trial experiment with three different corn seed hybrids with various sonication times.

FIG. 17 shows a table and with data from an experiment identical to the experiment that generated the data for the table of FIG. 16 performed at 75% amplitude.

FIG. 18 shows the uptake of cresyl violet dye into corn seeds.

FIG. 19 shows a table with data from an experiment with toluidine blue stain in corn seeds.

FIG. 21 shows a table of data from an experiment conducted with corn seed hybrid sonicated in argon-saturated tap water for various time periods.

FIG. 22 shows a table of data from several trials of an experiment conducted with corn seed hybrid saturated in argon saturated tap water.

FIG. 23 shows a table of data from an experiment identical to the experiment that generated the data for the table of FIG. 22, except performed for a different time period.

FIG. 24 shows a table of data from an experiment identical to the experiment that generated the data for the table of FIG. 22, except performed for a different time period.

FIG. 25 shows a table of data from an experiment identical to the experiment that generated the data for the table of FIG. 22, except performed for a different time period.

FIG. 26 shows a table of data from an experiment identical to the experiment that generated the data for the table of FIG. 22, except performed for a different time period.

FIG. 27 shows a table of data from an experiment identical to the experiment that generated the data for the table of FIG. 22, except performed for a different time period.

FIG. 29 shows a table of data from an experiment performed on sonicated and soaked groups of corn seeds after an extended delay between sonication and imbibition.

FIG. 32 shows a table of germination rates produced in an experiment performed on sonicated and soaked groups of corn seeds with and without a delay between sonication and imbibition.

DETAILED DESCRIPTION OF THE INVENTION

The invention describes a novel sonication and imbibition process that imparts an enhanced stable memory for subsequent uptake of a substance into a seed, particularly a substance useful for enhancing a growth characteristic of the seed with that characteristic transferring to an advantage for the resultant plant, and for the uptake of water into seeds for processing purposes. The growth characteristic could be a resistance to a certain type of yield reducing pest, or a particular growth advantage based on the introduction of a developmental nutrient. In particular, pests can take the form of insects, weeds, mold, mildew, and fungi. The substance responsible for imparting the enhanced growth characteristic could comprise an insecticide for giving the seed a resistance to a particular variety of insects, an herbicide for giving the seed a resistance to a particular variety of weed or plant, or a fungicide giving the seed a resistance to a particular variety of mold, mildew, or fungi.

In the way of further illustrative examples of applications of the present invention, it is anticipated that the present method is applicable to the process of corn wet milling used to produce corn starch, corn sweetener, corn oil, ethanol and animal feed by-products. Wet milling consists, generally, of five main steps: 1) steeping; 2) germ separation; 3) fiber washing and drying; 4) starch gluten separation; and 5) starch washing. The steeping step involves soaking corn kernels in a solution of sulfurous acid and water for a period of up to 48 hours. The steeping process cleans the corn kernels and softens the kernels to better allow the cracking the kernels to remove the germ, which contains the oil. As demonstrated herein, the sonication and imbibition process of the present invention would dramatically reduce the time required for steeping by accelerating the uptake of the water solution into the corn kernel.

Figure 20:
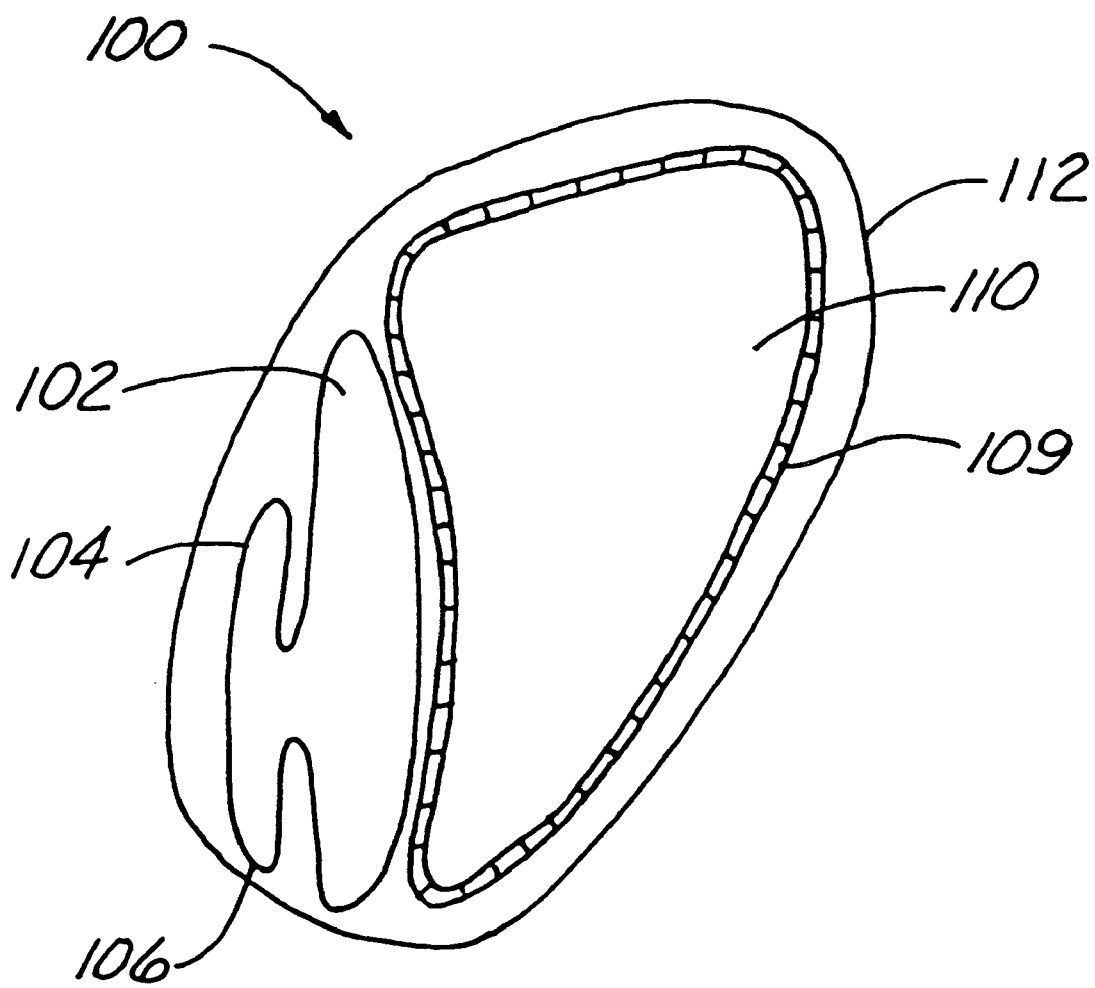
FIG. 20 shows a barley seed.

Moreover, imbibition plays a critical role in barley seed germination of particular interest in the field of factory malting. FIG. 20 shows a barley seed embryo 100, which includes a cotyledon 102 or the seed leaf, an epicotyl 104, which becomes the shoot, and a radicle 106, which becomes the root. Additionally, FIG. 20 shows a seed coat 112, an endosperm 110, and the aleurone layer 108.

The malting process, used for the production of certain alcoholic beverages, involves three basic steps: 1) steeping; 2) germination; and 3) kilning. In barley steeping, the amount and the uniformity of water uptake proves important. The time under water, the water temperature, the barley variety, and barley maturity comprise essential factors in creating the correct cast moisture. Steeping takes place in steep tanks where the barley seed 100 is mixed with a solution of water. The tanks are periodically roused with compressed air, to better ensure even uptake of the steeping solution. Uniform moisture content is very important to the quality and uniformity of the end product of the malting process.

The barley seeds 100 then begin to germinate. Barley's main role in the malting process is in the contribution of a rich source of sugar. Barley seeds 100, however, in their dry state contain very little sugar, but hold a large reserve of starch in the endosperm 110. Starch is a polymer of sugar, and through an interaction during germination, the starch is converted to sugar. The biochemistry of this process begins with the imbibition of water through the seed coat 112 and into the interior of the barley seed. The water reacts with the cell embryo in a manner that releases a chemical known as gibberellic acid (GA), a plant hormone. The GA is transported throughout the barley seed 100 until it arrives at the aleurone layer 108 that surrounds the endosperm 110. In the aleurone layer 108, the GA acts to turn on certain genes in the nuclear DNA. The genes are transcribed resulting in the creation of messenger RNA, which interacts with a ribosome to begin the process of protein synthesis, or translation. The result is the creation of a protein called amylase. The amylase is transported out from the aleurone cells 108 and into the endosperm 110. The amylase is an enzyme that acts as a catalyst for the hydrolysis of starch into sugar.

The process of converting the starch to sugar in barley seeds is dose dependent. In other words, the amount of GA present effects the rate and uniformity of the germination and conversion process. Consequently, imbibition of a solution of water and GA according to the methods of the present invention will significantly reduce the amount of time in the malting process, and will increase the rate and uniformity of the germination and conversion of starch to sugar. Additionally, those of ordinary skill in the art will realize that the methods of the present invention would apply equally to other growth hormones.

The sonication and imbibition process of the present invention is directed in particular to such important agricultural seeds as corn, barley, and soybeans by the sonication of such seeds in a liquid medium, preferably water. Again, those of ordinary skill in the art will appreciate the applicability of the present invention to other seed types, without departing from the intended scope. The sonication is by the application of sound waves at ultrasonic frequencies from between about 15 kHz and 100 kHz and preferably between about 20 kHz and 30 kHz, with an optimum near 20 kHz.

Ultrasonic energy is applied to the liquid and seed mixture by a sound transducer immersed in the liquid medium. While not wishing to be bound by any particular theory as to the mechanism of the subject of the invention, it is currently believed that the acoustic energy is carried through the liquid by oscillations of the liquid molecules in the direction of propagation. This produces alternating adiabatic compressions and decompressions together with corresponding increases and decreases in density and temperature. If the periodic decreases of pressure in the liquid are sufficiently high during the negative pressure phase, the cohesive forces of the liquid may be exceeded, at which point small cavities are formed by the process of cavitation. These small cavities then rapidly collapse, producing a very large amplitude shock wave with local temperatures up to a few hundred degrees centigrade or more. The collapse of the cavities is also known to create electrical discharges upon their collapse, giving rise to the effect known as sonoluminescence.

The effects of cavitation are greatly enhanced through the introduction of a variety of gases into the liquid. In the early 1930s, Frenzel and Schultes observed that photographic plates become exposed or fogged when submerged in water exposed to high frequency sound. This observation was the first recorded for the emission of light by acoustic waves or sonoluminescence. The physics of the phenomenon are not well understood.

With regard to the present invention, degassed distilled water requires an energy density level of approximately 1 to 10 watts/cm$^2$ before cavitation occurs. By saturating the water with a noble gas, such as one or more of the inert gases helium, neon, argon, krypton, xenon, or radon, cavitation effects are seen at much lower energy density levels and the effects at energy density levels on the order of 1 to 10 watts/cm$^2$ are greatly enhanced. This effect is believed to be due to the creation of microbubbles, which more easily form the small cavities upon the application of sonic energy. Additionally, the cavities in the presence of the saturated gas are believed to generate shock waves of larger amplitude upon collapse of the cavities than are achieved with degassed water. In particular, it is believed that when tap water was saturated with argon gas, helium gas, or argon and helium gasses, generally more dramatic uptake will be observed and such effects were reproducible from experiment to experiment. Other experiments in which the saturating gas was nitrogen also exhibited enhanced effects, but not nearly as pronounced as with argon. However, some experiments conducted with tap water and with boiled double distilled water also produced satisfactory results.

Since cavitation results in mechanical stress, sonication may create or enlarge fissures in the seed coat pericarp similar to scarification, a well-known process by which certain seeds, especially seeds with thick seed coats, are able to germinate. Scarification is believed to accelerate the imbibition of water through the pericarp. Simple scarification is unlikely to explain the novel effect disclosed herein, since scanning electron micrographs suggest no increase in the number of fissures in treated seed, but do indicate a change in pericarp texture. It has been found that the sonication process accelerates the imbibition of water. Cavitation may also result in physiological or biochemical changes in the seed that prime the germination process so that upon exposure of the seed to planting conditions, less time is needed for the seed to initiate germination, measured by the time when the radicle pushes through the pericarp. One mechanism proposed for causing physiological or biochemical changes is the production of free radicals by cavitation.

The present method is carried out using an ultrasonic frequency generator for driving a piezoceramic sonicator, the horn of which is immersed in the liquid surrounding the seeds. After sonication, the seeds are dried, and then placed on a water-saturated filter pad, or in some cases, in wet soil, to induce germination. The temperature during germination has been varied to analyze the effect of the treatment on germination at various temperatures. Measurements which have been monitored in different experiments have included the time of emergence of the primary root, the time of emergence of secondary roots, the time for emergence of coleoptile, the root length and weight, the root area, the estimated volume of the root, the coleoptile length and weight, and the uptake of water. The seeds tested were first generation ($F_1$) hybrid seed corn.

Apparatus

Figure 1:
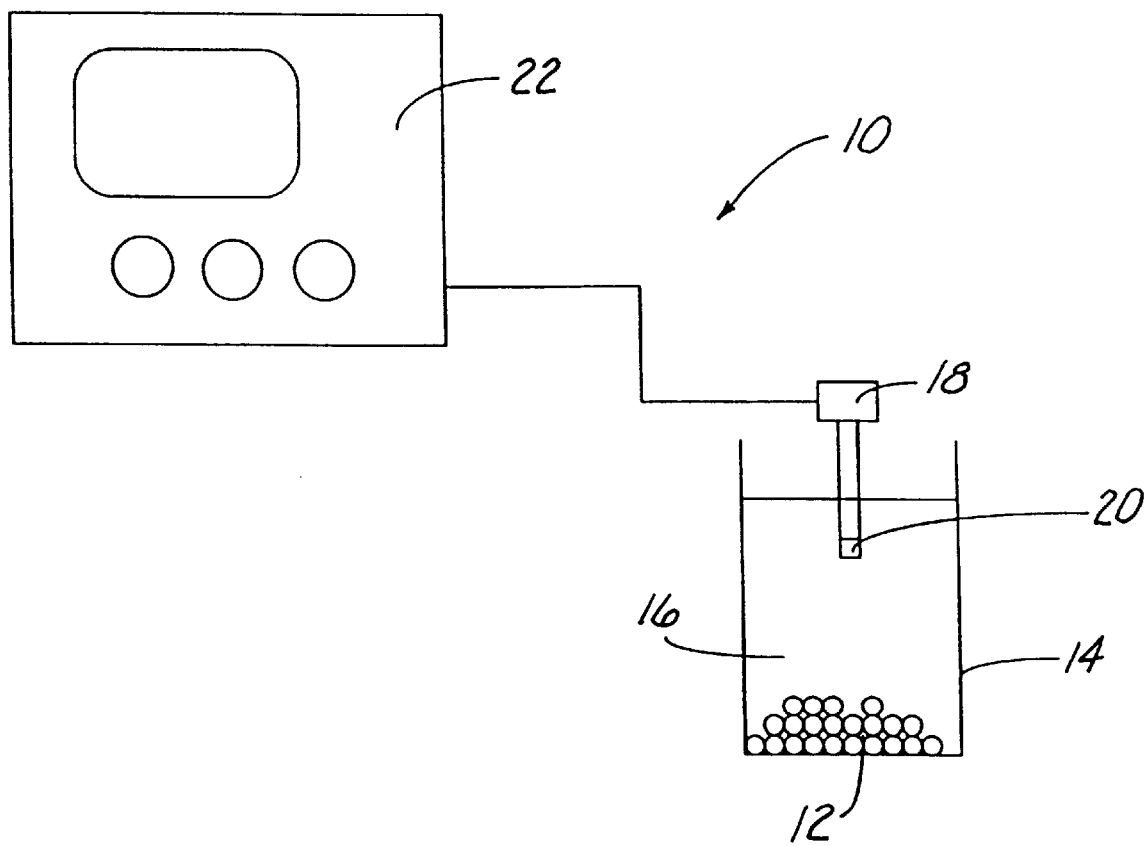
FIG. 1 is a diagrammatic view of the apparatus for practicing the present invention.

The apparatus used in the treatment of seeds according to the present invention is illustrated diagrammatically in FIG. 1, generally at 10. Seeds 12 are placed in a container 14 and covered with a liquid medium 16. A sound transducer 18 is suspended with the horn 20 of the transducer immersed in the liquid medium 16. The transducer is connected to an ultrasonic frequency generator 22. In the preferred embodiment, the sound transducer 18 is a piezoceramic transducer, Model VCX600 obtained commercially from Sonics and Materials, Inc. Alternative transducers may be used. Magnetostrictive transducers are capable of delivering higher levels of sound energy to the liquid media and may be preferable if higher sound densities are desired, for example if large quantities of seed are to be sonicated. The frequency generator 22 is a Model 33120Q obtained commercially from Hewlett Packard and is matched to the transducer 18. It has a frequency range of between 15 kHz and 30 kHz and can supply between 0 and 500 watts to the sound transducer 18. In the experiments described herein, the power densities were between 30 watts per $cm^2$ and 80 watts per $cm^2$, although given the rated efficiency of the sound transducer 18, higher power densities can be achieved in the container 14.

Figure 28:
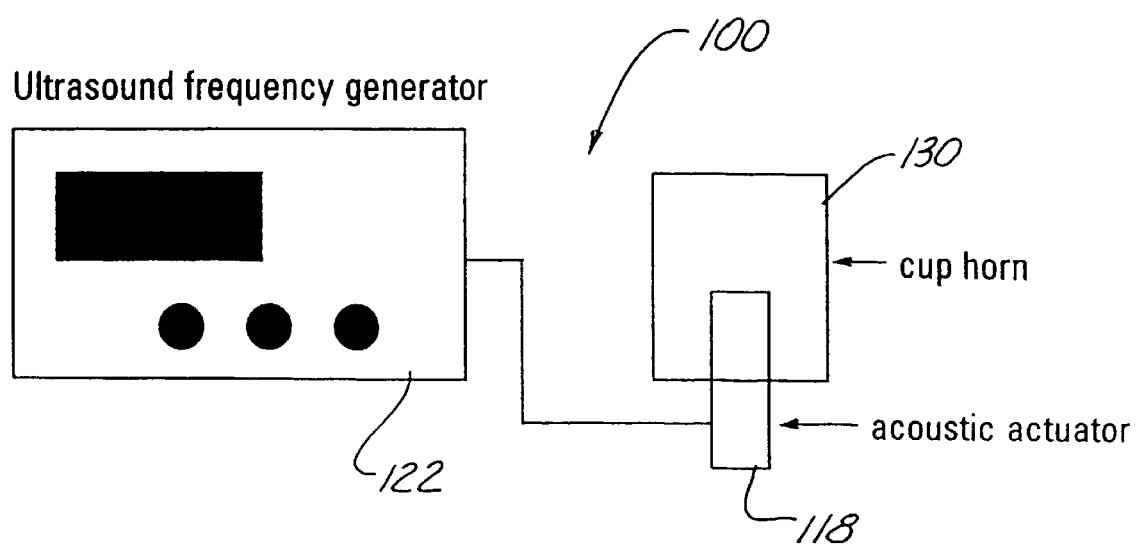
FIG. 28 shows an alternative apparatus for practicing the present invention.

FIG. 28 shows an alternative embodiment of an apparatus 100 of the present invention. This differs from the apparatus 10 in the configuration of the cup horn 130. The apparatus 100 includes an ultrasound frequency generator 122, and an acoustic actuator 118 (or sound transducer). These components are generally the same as the ultrasonic frequency generator 22, and the sound transducer 18 of apparatus 10. The cup horn 130 replaces the horn 20 and container 14 of apparatus 10. In the apparatus 100 the cup horn 130 comprises a single piece member, which includes a horn surrounded by a glass container. The horn of the cup horn 130 is generally longer and flatter than the horn 20 of apparatus 10. The cup horn 130 mounts upward, relative to its counterpart in apparatus 10. The sample rests within the cup horn 130, otherwise, sonication takes place in a similar fashion regardless of the apparatus 10, 100 used. Water may be circulated through the wall of the cup horn 130 to maintain a constant temperature.

Experiments

A series of experiments were performed to demonstrate the effectiveness of the methods of the present invention. FIG. 2 shows the results of an experiment conducted with a Pioneer® #3394 corn seed hybrid. The experiment involved twenty trials with one seed per trial sonicated at twenty kHz with a three mm probe, at an amplitude of 39%, for a period of ten minutes, in helium-saturated tap water. The seeds were placed individually in a fourteen ml test tube packed in ice. By comparison, twenty Pioneer® #3394 corn seed hybrid seeds were soaked in helium-saturated tap water for a period of ten minutes. The weight in mg. of each of the seeds was measured prior to sonication and soaking, and measured again after sonication and soaking. FIG. 2 shows the relative sonicated and soaked weight difference in absolute amount, and in relative terms. The relative percent water uptake reflects the weight gain as a percentage of the seed weight prior to sonication and soaking. The mean and standard deviation across the entire experiment is reflected in the last lines of the table depicted in FIG. 2, and shows clearly the enhanced uptake of water into the seeds due to the sonication process.

FIG. 3 shows the results of an experiment conducted with a Pioneer® #3939 corn seed hybrid. The experiment involved twenty trials with one seed per trial sonicated at twenty kHz with a three mm probe, at an amplitude of 39%, for a period of ten minutes, in argon-saturated tap water. The seeds were placed individually in a fourteen ml test tube packed in ice. By comparison, twenty Pioneer® #3939 corn seed hybrid seeds were soaked in argon-saturated tap water for a period of ten minutes. The weights in mg. of each of the seeds was measured prior to sonication and soaking, and measured again after sonication and soaking. FIG. 3 shows the relative sonicated and soaked weight difference in absolute amount, and in relative terms. The relative percent water uptake reflects the weight gain as a percentage of the seed weight prior to sonication and soaking. The mean and standard deviation across the entire experiment is reflected in the last lines of the table depicted in FIG. 3, and again shows clearly the enhanced uptake of water into the seeds due to the sonication process.

FIG. 4 repeats the experiment described above and represented by the data shown in FIG. 3, except with Pioneer® #3963 corn seed hybrid seeds. Similarly FIG. 4 shows that superior water uptake result from the sonication process.

FIG. 5 repeats the experiment described above and represented by the data shown in n FIG. 2, except that argon and helium saturated tap water was used for both the sonicated and soaked groups, again with similar results.

FIG. 6 repeats the experiment described above and represented by the data shown in FIG. 3, except with Pioneer® #5005 sweet corn hybrid seeds.

FIG. 7 repeats the experiment described above and represented by the data shown in FIG. 2, except that argon-saturated tap water was used for both the sonicated and the soaked groups.

FIG. 8 repeats the experiment described above and represented by the data shown in FIG. 2, except that tap water was used for both the sonicated and the soaked groups.

FIG. 9 repeats the experiment described above and represented by the data shown in FIG. 2, except that boiled double distilled water was used for both the sonicated and the soaked groups.

FIG. 10 shows the results of an experiment conducted with a Pioneer® #3394 corn seed hybrid. The experiment involved a trial with twenty seeds per trials sonicated at twenty kHz with a forty-five mm probe, at an amplitude of 30%, for a period of ten minutes, in argon-saturated tap water. Twelve groups of twenty seeds each were placed in a 2" diameter aluminum cup packed in ice. By comparison, twelve groups of twenty Pioneer® #3394 corn seed hybrid seeds were soaked in argon saturated tap water for a period of ten minutes. The weight of the twenty seeds in mg. was measured prior to sonication and soaked and the average weight of seed determined. They were measured again after sonication and soaking. FIG. 10 shows the average weight per seed for each of the twelve groups of twenty seeds. FIG. 10 shows the relative sonicated and soaked weight difference in absolute amount, and in relative terms. The relative percent water uptake reflects the weight gain as a percentage of the seed weight prior to sonication and soaking. The mean and standard deviation across the entire experiment is reflected in the last lines of the table depicted in FIG. 10. Again, the data shows clearly the enhanced uptake of water into the seeds due to the sonication process.

FIG. 11 repeats the experiment described above and represented by the data shown in FIG. 10, except that Pioneer® #3820 corn seed hybrid was used.

FIG. 12 repeats the experiment described above and represented by the data shown in FIG. 10, except that Pioneer® #3963 corn seed hybrid was used.

FIG. 13 shows the results of an experiment conducted with a No. 3-141 barley seed, provided by Briess Malting Company of Chilton, Wis. The experiment involved twenty trials with one seed per trial sonicated at twenty kHz with a three mm probe, at an amplitude of 39%, for a period of eight minutes, in argon saturated tap water. By comparison, twenty No. 3-141 barley seeds were soaked in argon-saturated tap water for a period of eight minutes. The weights in mg. of each of the seeds was measured prior to sonication and soaking, and measured again after sonication and soaking. FIG. 13 shows the average weight per seed for each of the twenty seeds. FIG. 13 shows the relative sonicated and soaked weight difference in absolute amount, and in relative terms. The relative percent water uptake reflects the weight gain as a percentage of the seed weight prior to sonication and soaking. The mean and standard deviation across the entire experiment is reflected in the last lines of the table depicted in FIG. 11, and the results show that the barley seeds react to the sonication process in a manner similar to the corn hybrid seeds.

FIG. 14 shows the results of a series of experiments conducted with a Pioneer® #9281 soybean seed hybrid. The experiment involved three groups each comprised of five trials, each trial in turn comprising twenty seeds sonicated at twenty kHz with a forty-five mm probe, at an amplitude of 30%, in argon-saturated tap water. Group 1 was sonicated for two minutes, group 2 was sonicated for four minutes, and group 3 was sonicated for six minutes. Each group of twenty seeds was placed in a 2" diameter aluminum cup packed in ice. By comparison, the soaking portion of the experiments were performed on three groups each comprising five trials, each trial comprising twenty Pioneer® #9281 soybean hybrid seeds soaked in argon saturated tap water. Group 1 was soaked for two minutes, group 2 was soaked for four minutes, and group 3 was soaked for six minutes. The weight in mg. of each of the seeds was measured prior to sonication and soaking, and measured again after sonication and soaking. FIG. 14 shows the weight for the entire seed groups of the five trials of twenty seeds for each of the three groups. FIG. 14 shows the relative sonicated and soaked weight difference in absolute amount, and in relative terms. The relative percent water uptake reflects the weight gain as a percentage of the seed weight prior to sonication and soaking. The mean and standard deviation across the entire experiment is reflected in the last lines of each groups as shown in FIG. 14, and again shows clearly the enhanced uptake of water into the seeds due to the sonication process.

FIG. 15 shows the results of a series of experiments conducted with the Pioneer® #3394 corn seed hybrid. The experiments involved several trials of twenty seeds per trial sonicated at twenty kHz with a forty-five mm probe, at an amplitude of 39%, in argon-saturated tap water. The sonication time varied from two to twelve minutes in two-minute increments. Each group of twenty seeds was placed in a 2" diameter aluminum cup packed in ice. By comparison, the soaking portion of the experiments was performed on groups of twenty Pioneer® #3394 corn hybrid seeds soaked in argon saturated tap water. The soaking time varied from two to twelve minutes in two-minute increments. FIG. 15 shows the total weight for the twenty seed groups for each of the varying sonication and soaking time groups. FIG. 15 shows the relative sonicated and soaked weight difference in absolute amount, and in relative terms for the entire seed groups. The relative percent water uptake reflects the weight gain as a percentage of the seed weight prior to sonication and soaking. The results allow comparison of the relative amounts of water uptake for sonication and for soaking, and show that over all time periods sonication produces superior results.

FIG. 16 shows the results of a series of experiments conducted with three different hybrid corn seeds, Pioneer® #3394, Pioneer® #3573, and Pioneer® #65672 Honey & Pearl respectively. The experiment involved several trials of twenty seeds per trial sonicated at twenty kHz with a thirteen mm probe, at an amplitude of 100%, in argon-saturated tap water. The sonication time varied from two to ten minutes in two-minute increments. Each group of twenty seeds was placed in a 125 ml glass beaker packed in ice. By comparison, the soaking portion of the experiments was performed on one group of twenty seeds for each of the above-identified hybrids. The soaking time was fixed at ten minutes for each of the hybrids. FIG. 16 shows the total weight for the twenty seed groups for each of the varying hybrids, sonication time groups, and soaking groups. FIG. 16 shows the relative sonicated and soaked weight difference in absolute amount, and in relative terms for the entire seed groups. The relative percent water uptake reflects the weight gain as a percentage of the seed weight prior to sonication and soaking. The results allow for comparison of the relative amounts of water uptake for sonication over a variety of time periods for three different hybrids. In all cases, the uptake percentages for the sonicated seeds exceeded the uptake from soaking for the same hybrids.

FIG. 17 repeats the experiment described above and represented by the data shown in FIG. 16, except that an amplitude of 75% was used.

FIG. 18 shows that sonication promotes the uptake of a cresyl violet dye into corn seeds. Sonication facilitates the uptake of the dye into the corn seeds, and into the embryo of the seed. By contrast the control seeds show that soaking accomplishes only minimal uptake, which does not penetrate beyond the periphery of the seed. The results depicted in FIG. 18 demonstrate the effectiveness of the sonication method in introducing substances of differing molecular weights into seeds.

In a similar manner, FIG. 19 shows that the sonication process is also effective at introducing a toluidine blue stain into corn seeds. In this experiment, sonication took place in two groups, with five trials per group, for a total time of fifteen minutes per trial. The sonication solution contained fifteen ml of water and 750 mg. of toluidine blue stain. After each trial the amount of stain absorbed was determined. After the five trials in each of the groups the total stain absorbed was calculated, and a percentage of stain uptake was calculated based on the amount of stain absorbed over the five trials as a percentage of the total amount of stain originally present. The procedure was repeated for two soaked groups each comprising five trials. FIG. 18 shows that the sonication process results in dramatically higher absolute and relative amounts of uptake of the toluidine blue stain.

The experiments described below were conducted with the apparatus 100, rather than the apparatus 10 used above. FIG. 21 shows the results of an experiment conducted with Pioneer #3394 corn seed hybrid. The experiment involved six groups of one seed each sonicated for one, two, four, six, eight, and ten 10 minutes in tap water saturated with five ml. of argon, at 30% amplitude in a polypropylene tube suspended in a cup horn 130 with cold water circulation. Each of the six groups represents the results of twenty individual trials. In comparison, the same experiment was performed for the same time groups, twenty trials each, except that the seeds were soaked only. The weights in mg. were measured prior to sonication and soaking, and again afterwards. FIG. 21 shows the total weights for each of the different groups of twenty seeds, and the relative and absolute weight differences for the sonicated and soaked groups. The results of this experiment show that the apparatus 10, 100 produce similar results, and that the sonicated seeds exhibit superior uptake of the solution when compared to the soaked seeds.

FIG. 22 shows the results of an experiment conducted with Pioneer #3394 corn seed hybrid. The experiment involved twenty trials with one seed per trial sonicated at twenty kHz, at an amplitude of 39%, for a period of one minute, in argon-saturated tap water. The seeds were placed individually in a polypropylene tube suspended in a large cup horn 130 with cold water circulation. By comparison, twenty Pioneer® #3394 corn hybrid seeds were soaked in argon-saturated tap water for a period of one minute. The weight in mg. of each of the seeds was measured prior to sonication and soaking, and measured again after sonication and soaking. FIG. 22 shows the relative sonicated and soaked weight difference in absolute amount, and in relative terms. The relative percent water uptake reflects the weight gain as a percentage of the seed weight prior to sonication and soaking. The mean and standard deviation across the entire experiment is reflected in the last lines of the table depicted in FIG. 22, and shows clearly the enhanced uptake of water into the seeds due to the sonication process.

FIG. 23 shows the results of an experiment identical to the experiment described above and represented by the data shown in FIG. 22, except that the time was extended from one minute to two minutes.

FIG. 24 shows the results of an experiment identical to the experiment described above and represented by the data shown in FIG. 22, except that the time was extended from one minute to four minutes.

FIG. 25 shows the results of an experiment identical to the experiment described above and represented by the data shown in FIG. 22, except that the time was extended from one minute to six minutes.

FIG. 26 shows the results of an experiment identical to the experiment described above and represented by the data shown in FIG. 22, except that the time was extended from one minute to eight minutes.

FIG. 27 shows the results of an experiment identical to the experiment described above and represented by the data shown in FIG. 22, except that the time was extended from one minute to ten minutes.

The series of experiments depicted in FIGS. 22–27 demonstrates the response to uptake over time for sonicated and soaked groups of seed, and again demonstrates the superiority of the sonication process. In principle, the overall impact of the above experiments demonstrates the ability of the imbibition process to uptake a variety of substances into seeds of a variety of different plants. As a result, introduction of any number of substances capable of imparting growth enhancing characteristics to a plant can be affected through the imbibition process of the present invention.

As is demonstrated in more detail in the commonly owned co-pending U.S. patent application Ser. No. 08/886,901 filed Jul. 2, 1997 entitled METHOD FOR ENHANCING GERMINATION, incorporated herein by reference, the enhanced growth characteristic should continue to affect the seed and resultant plant for extended periods of time. Enhanced germination effects continue to manifest in sonicated seeds after periods of extended drying down and re-hydration.

Memory Effect

The forgoing experiments demonstrate the general efficacy of the ultrasound sonication process in enhancing the imbibition of substances into various types of seeds. A closer consideration of the effect raises the question of whether the ultrasound treatment described hereinabove contemporaneously drives the enhanced imbibition, or whether the ultrasound treatment alters some characteristics of the seed thereby imparting an enhanced stable ability to uptake a substance at a time after sonication. If the latter proposition holds, the sonication would impart in the seed a memory for enhanced imbibition of substances, thereby permitting separation in time of the sonication and imbibition steps of the method without diminishing the enhanced imbibition effect. Further experimentation was conducted, essentially in the manner described hereinabove, to test this memory effect.

To test whether ultrasound drives water into seed by cavitation, or whether it causes a change in seed, which in turn results in enhanced water uptake, two groups of corn seed were immersed in water for ten minutes, one group with ultrasound (test) and the other group merely soaked (control). Then, the test and control seeds were dried and stored for three weeks. The stored seeds were then placed in water for fifteen minutes, and the increase in the wet weight of the test seeds was compared to that of the control seeds. The seeds were not sonicated in this second phase. The results, presented in FIG. 29, demonstrate that the effect of ultrasound is not to drive the water into seed, but rather to alter the seed so that it then takes up water at an enhanced rate independent of, and subsequent to, the presence of ultrasonic cavitation.

This memory effect was also seen in an experiment that was performed on two groups of corn seeds treated with fluorescently tagged dextran. One group of ten corn seeds was sonicated in water for ten minutes, and a second group of ten corn seeds was soaked in water for the same period of time. After drying and storing both groups of seed for two days, the seeds were soaked in fluorescently tagged dextran. After re-hydration, the germ portion of the seed was removed and measured for the presence of the fluorescently labeled dextran. The average uptake of dextran in the ultrasound-treated and stored seed was 6.2 nanograms of dextran per milligram of corn germ (standard deviation of 3.4 for ten samples). The average uptake of the non-sonicated control group was 0.65 nanograms of dextran per milligram of corn germ (standard deviation of 0.34 for ten samples). These results further confirm that the sonication imparts to the seeds an enhanced stable ability to subsequently imbibe substances.

Still further experimentation, represented in FIGS. 30a–b and FIGS. 31a–b, showed that ultrasound-induced water uptake represents a unique event dissociable from normal water uptake. The differences in uptake rates of sonicated and soaked seeds showed that the sonicated seeds initially exhibit a much faster rate of uptake than the non-sonicated seeds. After this initial period of time, both the sonicated and soaked seed groups exhibit similar rates of uptake. In particular, FIGS. 30a–b show that when seeds were treated with ultrasound for ten minutes, and then subsequently soaked the seeds exhibited an initial rapid increase in wet weight of approximately 22% in the first few minutes, followed by a slower continuous increase over the next several hours. When control seeds were soaked for an initial ten minute period and subsequently soaked, they exhibited a small rapid initial increase in water content of approximately 6.0% during the first few minutes, followed by a slow continuous increase over the next several hours (FIGS. 30a–b). These results demonstrate that ultrasound-stimulated water uptake is achieved very rapidly and the subsequent rates of uptake are then comparable in ultrasound-treated and soaked seeds. However, even after 20 hours of soaking the water content of un-sonicated seed does not catch-up to that of ultrasound-treated seed (see FIG. 30a). Thus, the sonication process fundamentally enhances the rate of uptake of substances into the seeds.

Figure 30:
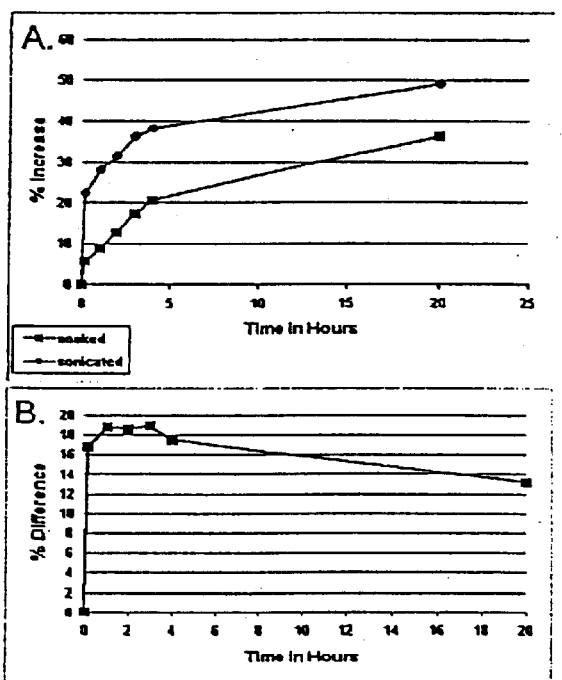
FIGS. 30a–b show a graphical representation of the percent weight gain versus imbibition time based on data taken from an experiment performed on sonicated and soaked groups of corn seeds with no delay between sonication and imbibition.
Figure 31:
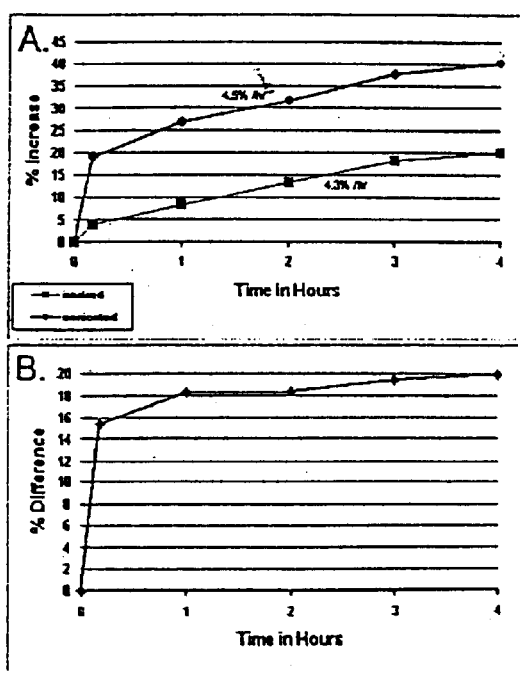
FIGS. 31a–b show a graphical representation of the percent weight gain versus imbibition time based on data taken from an experiment performed on sonicated and soaked groups of corn seeds with a three day delay between sonication and imbibition.

Experimentation also showed that this increase in absorption rate associated with the sonication and imbibition process is stable even when the sonication and imbibition steps are separated in time (see FIGS. 31a–b). To show the stability of the enhanced imbibition effect over time, seeds were treated with ultrasound, dried, stored for three days, and then soaked for four hours. The results of this experiment (FIGS. 31a–b) were similar to those obtained with the seeds treated with ultrasound and immediately soaked without drying and storage (FIGS. 30a–b). The combined results of the experiments shown in FIGS. 30–31 demonstrate that a time stable memory for enhanced imbibition persists over long periods of storage, and that the change imparted to the seed imparted during sonication is independent from the imbibition step.

Additionally, results demonstrate that ultrasound treatment alters seed without negatively affecting the proportion of seeds that germinate. In FIG. 32, the germination rate of ultrasound-treated and soaked seeds was determined. In experiment 1, cells were sonicated or soaked, then placed on wet filters and germination monitored over periods of time ranging from forty-eight to seventy-two hours. At seventy-two hours, 100% of test and control seeds germinated. In experiment 2, seeds were sonicated or soaked, then dried and stored for three months before germination testing. In both cases, 100% of the seeds germinated within at least seventy-two hours.

Ultrasound treatment causes an accelerated increase in seed hydration. The effect of ultrasound is not to drive water into the seed, but rather to alter the seed so that it will take-up water at an enhanced rate, even in the absence of ultrasound. This enhanced imbibition effect is stable. It is maintained when seed is dried and stored after ultrasound treatment. Ultrasound does not negatively affect germination. The ability to separate the sonication and imbibition steps without diminishing the enhanced imbibition effect results in significant practical advantages. The seed can receive ultrasonic cavitational treatment at a first point of time, and after waiting a predetermined period of time, the seed will exhibit an enhanced ability to imbibe a substance. This allows for sonicating the seed, and storing the seed until planting or processing begins. At this later date, the decision about what substance to imbibe into the seed can be specifically tailored to the then existing planting, growth, or processing conditions. This allows for more efficient and timely preparation of the seed. Further, the imbibing step does not require sophisticated equipment or technical expertise, and thus can be performed in the field.

Furthermore, those of ordinary skill in the art will understand that by demonstrating the basic technique of enhanced imbibition with a substance like water, any other type of substance can be imbibed into the seed in the same manner. As mentioned hereinabove, these substances can include water, pesticides, insecticides, herbicides, fungicides, and growth hormones; however, the applicability of the invention is not limited to these substances. The enhanced imbibition method can be used with substances that enhance any growth characteristic of the seed or resultant plant, or otherwise add value to the seed during commercial processing. For example, the method of the present invention could be used to imbibe into a seed substances that would inhibit germination for certain predetermined periods of time. Delaying germination in this manner would prove beneficial in commercial farming by allowing growers to plant seed prior to the occurrence of optimum planting or germination conditions. This would relieve growers of the burden of planting their entire crop at once when the soil and weather conditions reach a preferred state for planting. Thus, the substances contemplated for use with the present invention need not necessarily be substances that make a plant grow faster, stronger, or resistant in some manner.

Although the invention has been described with respect to a preferred embodiment thereof, it is to be also understood that it is not to be sole limited since changes and modifications can be made therein which are within the full intended scope of this invention as defined by the appended claims.

We claim:

1. A sonication and imbibition process for the uptake of a substance into a seed, comprising the steps of:
   a) immersing said seed in water that includes a dissolved gas;
   b) introducing into said water sound energy at a frequency and energy density sufficient to create cavitation in said liquid;
   c) sonicating said seed for a period of time sufficient to result in an alteration of said seed such that said seed takes on a memory for an improved rate of uptake of a substance into said seed, wherein said substance is capable of enhancing a growth characteristic of said seed;
   d) waiting a predetermined amount of time; and
   e) imbibing said seed with said substance after said predetermined amount of time.

2. The invention in accordance with claim 1 wherein said predetermined amount of time is up to about three months.

3. The invention in accordance with claim 1 wherein said predetermined amount of time is between about two days and about three months.

4. The invention in accordance with claim 1 wherein said dissolved gas comprises helium.

5. The invention in accordance with claim 1 wherein said dissolved gas comprises argon.

6. The invention in accordance with claim 1 wherein said dissolved gas comprises helium and argon.

7. The invention in accordance with claim 1 wherein said gas includes one or more gases selected from the group consisting of helium, neon, argon, krypton, xenon and radon.

8. The invention in accordance with claim 1 wherein said seed comprises corn seed.

9. The invention in accordance with claim 1 wherein said seed comprises barley seed.

10. The invention in accordance with claim 1 wherein said seed comprises soybean seed.

11. The invention in accordance with claim 1 wherein said substance comprises a pesticide.

12. The invention in accordance with claim 11 wherein said pesticide comprises an insecticide.

13. The invention in accordance with claim 11 wherein said pesticide comprises an herbicide.

14. The invention in accordance with claim 11 wherein said pesticide comprises a fungicide.

15. The invention in accordance with claim 1 wherein said substance comprises a growth hormone.

16. The invention in accordance with claim 1 wherein said sound energy is at a frequency of between about 15 kHz and about 100 kHz.

17. The invention in accordance with claim 1 wherein said sound energy is at a frequency of between about 15 kHz and about 30 kHz.

18. The invention in accordance with claim 1 wherein said sound energy is at an energy density of between about 1 watt/cm$^2$ and about 10 watts/cm$^2$.

19. The invention in accordance with claim 1 wherein said sound energy is applied for between 1 minute and about 15 minutes.

20. A sonication and imbibition process for the uptake of a liquid solution of water or sulfurous acid water into a corn kernel, comprising the steps of:

a) immersing a corn kernel in a liquid solution comprised of sulfurous acid, water and a dissolved gas wherein said liquid solution is capable of softening the corn kernel;

b) introducing into said liquid solution sound energy at a frequency and energy density sufficient to create cavitation in said liquid solution;

c) sonicating said corn kernel for a period of time sufficient to result in an alteration of said corn kernel such that said corn kernel takes on a memory for an improved rate of uptake of a substance into said corn kernel;

d) waiting a predetermined amount of time; and e) imbibing said corn kernel with said substance after said predetermined amount of time.

21. A sonication and imbibition process for the uptake of a liquid solution of water into a barley seed, comprising the steps of:

a) immersing a barley seed in a liquid solution water and a dissolved gas wherein said liquid solution is capable of penetrating said barley seed;

b) introducing into said liquid solution sound energy at a frequency and energy density sufficient to create cavitation in said liquid solution;

c) sonicating said barley seed for a period of time sufficient to result in an alteration of said barley seed such that said barley seed takes on a memory for an improved rate of uptake of said substance into said barley seed;

d) waiting a predetermined amount of time; and e) imbibing said barley seed with said substance after said predetermined amount of time.

22. The invention in accordance with claim 21 wherein said liquid solution further comprises gibberellic acid.

23. A seed with a memory for an improved rate of uptake of a substance treated according to the process of claim 1.

24. The invention in accordance with claim 1 wherein said substance is a substance that inhibits germination of said seed.

* * * * *